United States Patent
Quan et al.

(10) Patent No.: US 8,798,965 B2
(45) Date of Patent: Aug. 5, 2014

(54) GENERATING THREE-DIMENSIONAL MODELS FROM IMAGES

(75) Inventors: Long Quan, Hong Kong (CN); Jianxiong Xiao, Hong Kong (CN); Tian Fang, Hong Kong (CN); Peng Zhao, Hong Kong (CN)

(73) Assignee: The Hong Kong University of Science and Technology, Kowloon (HK)

(*) Notice: Subject to any disclaimer, the term of this patent is extended or adjusted under 35 U.S.C. 154(b) by 191 days.

(21) Appl. No.: 13/148,173

(22) PCT Filed: Feb. 3, 2010

(86) PCT No.: PCT/CN2010/000148
§ 371 (c)(1),
(2), (4) Date: Oct. 24, 2011

(87) PCT Pub. No.: WO2010/088840
PCT Pub. Date: Aug. 12, 2010

(65) Prior Publication Data
US 2012/0041722 A1    Feb. 16, 2012

Related U.S. Application Data

(60) Provisional application No. 61/202,229, filed on Feb. 6, 2009.

(51) Int. Cl.
*G06F 17/50* (2006.01)
*G06T 15/00* (2011.01)
*G06K 9/00* (2006.01)
*G06K 9/34* (2006.01)

(52) U.S. Cl.
USPC .............. 703/1; 345/419; 382/154; 382/173

(58) Field of Classification Search
USPC .......... 703/1, 2; 382/154, 171, 173, 254, 260; 345/419, 420, 427
See application file for complete search history.

(56) References Cited

U.S. PATENT DOCUMENTS

| 5,495,576 A | 2/1996 | Ritchey |
| 6,124,864 A | 9/2000 | Madden et al. |

(Continued)

FOREIGN PATENT DOCUMENTS

| CN | 101329771 A | 12/2008 |
| EP | 1703470 | 9/2009 |
| TW | 200828182 A | 7/2008 |

OTHER PUBLICATIONS

Fruh et al. (Constructing 3D City Models by Merging Aerial and Ground views, pp. 52-61 (10pages), 2003).*
Schnitman et al. (Inducing Semantic Segmentation from an example, pp. 373-384 (12 pages), 2006).*
Xiao et al. (Image-based Façade Modeling, ACM Transactions on Graphics, vol. 27, No. 5, Article 161, Dec. 2008, 12 pages).*

(Continued)

*Primary Examiner* — Kamini S Shah
*Assistant Examiner* — Andre Pierre Louis
(74) *Attorney, Agent, or Firm* — Amin, Turocy & Watson, LLP

(57) ABSTRACT

The subject disclosure relates to generating models from images. In an aspect, multi-view semantic segmentation is provided to recognize and segment images at the pixel level into semantically meaningful areas, and which can provide labels with a specific object class. In further aspects, a partition scheme is provided that can separate objects into independent blocks using major line structures of a scene. In addition, an inverse patch-based orthographic composition and structure analysis on a block is provided that can regularize noisy and missing reconstructed 3D data to facilitate image-based modeling.

20 Claims, 30 Drawing Sheets

(56) References Cited

U.S. PATENT DOCUMENTS

| | | | |
|---|---|---|---|
| 6,903,738 | B2 | 6/2005 | Pfister et al. |
| 6,983,082 | B2 | 1/2006 | Duiker |
| 7,174,039 | B2 | 2/2007 | Koo et al. |
| 7,477,768 | B2 | 1/2009 | Kaufman et al. |
| 7,812,839 | B2 | 10/2010 | Chu et al. |
| 2003/0038822 | A1* | 2/2003 | Raskar ............................. 345/632 |
| 2005/0063582 | A1 | 3/2005 | Park et al. |
| 2006/0227132 | A1 | 10/2006 | Jang et al. |
| 2008/0310733 | A1 | 12/2008 | Adabala |
| 2009/0141020 | A1 | 6/2009 | Freund et al. |
| 2011/0043604 | A1* | 2/2011 | Peleg et al. ...................... 348/36 |

OTHER PUBLICATIONS

Boykov, et al., "Fast approximate energy minimization via graph cuts." IEEE Trans. on Pattern Analysis and Machine Intelligence 23,11,1222-1239, (2001) 8 pages.
Canny, "A computational approach to edge detection." IEEE Trans. on Pattern Analysis and Machine Intelligence 8, 679-714, (1986) 20 pages.
Cornelis, et al., "3D urban scene modeling integrating recognition and re construction." International Journal of Computer Vision 78,2 (July), 121-141, (2008) 18 pages.
Curless, et al., "A volumetric method for building complex models from range images." In Proc. of the 23rd annual conference on Computer graphics and interactive techniques, ACM, 303-312, (1996) 10 pages.
Debevec, et al., "Modeling and rendering architecture from photographs: a hybrid geometry- and image-based approach." In Proc. of the 23rd annual conference on Computer graphics and interactive techniques, ACM, 11-20, (1996) 10 pages.
Dick, et al., "Modelling and interpretation of architecture from several images." International Journal of Computer Vision 60,2 (Nov.), 111-134, (2004) 50 pages.
Felzenszwalb, et al., "Efficient Graph-Based image segmentation." International Journal of Computer Vision 59,2, 167-181, (2004) 7 pages.
Frueh, et al., "Constructing 3d city models by merging ground-based and airborne views." In Proc. of IEEE Conference on Computer Vision and Pattern Recognition (2004), 24 pages.
Geman, et al., Stochastic relaxation, gibbs distributions, and the bayesian restoration of images. IEEE Trans. on Pattern Analysis and Machine Intelligence 6,6,721-741,21 pages.
Hartley, et al. "Multiple View Geometry in Computer Vision, second ed." Cambridge University Press, ISBN: 0521540518 (2004).
Lhuillier, et al., "A Quasi-Dense approach to surface reconstruction from uncalibrated images." IEEE Trans. on Pattern Analysis and Machine Intelligence, 418-433, (2005) 35 pages.
Muller, et al., "Image-based procedural modeling of facades." In ACM SIG GRAPH 2007 papers, ACM, San Diego, California, 85, (2007) 10 pages.
Oh, et al., " Image-based modeling and photo editing." In Proc. of the 28th annual conference on Computer graphics and interactive techniques, ACM, 433-442, (2001) 10 pages.
Oliva, et al., "Building the gist of a scene: the role of global image features in recognition." Progress in Brain Research 155, 23-36. PMID: 17027377, (2006) 23 pages.
Pearl, "Reverend bayes on inference engines: A distributed hierarchical approach." In Proc. of AAAI National Conference on AI, 133-136, (1982) 4 pages.
Pollefeys, et al., "Detailed Real-Time urban 3D reconstruction from video." International Journal of Computer Vision 78, 2 (Jul. 2008), 143-167, 43 pages.
Schindler, et al., "Line-Based structure from motion for urban environments." In 3D Data Processing, Visualization, and Transmission, Third International Symposium on, 846-853 (2006), 8 pages.
Shotton,et al. "TextonBoost for image understanding: Multi-Class object recognition and segmentation by jointly modeling texture, layout, and context." International Journal of Computer Vision 81, 1, 2-23 (2009).

Sinha, et al., "Interactive 3D architectural modeling from unordered photo collections." ACM Trans. Graph. 27, 5, 1-10 (2008) 10 pages.
Torralba, et al., "Sharing visual features for multiclass and multiview object detection." IEEE Trans. on Pattern Analysis and Machine Intelligence 29, 5, 854-869 (2007), 16 pages.
Van Den Hengel, et al., "VideoTrace: rapid interactive scene modelling from video." In ACM SIGGRAPH 2007 papers, ACM, San Diego, California, 86 (2007), 6 pages.
Werner, et al., "Model selection for automated architectural reconstruction from multiple views." In Proc. of the British Machine Vision Conference, 5362 (2002), 10 pages.
Winn, et al., "Object categorization by learned universal visual dictionary." In Computer Vision, 2005. ICCV 2005. Tenth IEEE International Conference on, vol. 2, 1800-1807 vol. 2 (2005), 8 pages.
Xiao, et al., "Image-based facade modeling." ACM Trans. Graph. 27,5,1-10, (2008) 10 pages.
Zebedin, et al., "Towards 3D map generation from digital aerial images." ISPRS Journal of Photogrammetry and Remote Sensing 60,6 (Sept.), 413-427 (2006), 20 pages.
Agarwala, et al., "Photographing long scenes with multi-viewpoint panoramas." ACM Transactions on Graphics (SIGGRAPH) 25,3,853-861 (2006), 9 pages.
Berg et al. "Parsing images of architectural scenes." In Proceedings of IEEE International Conference on Computer. Vision, 1-8 (2007), 8 pages.
Criminisi, et al., "Object removal by exemplar-based inpainting." In Proceedings of IEEE Computer Vision and Pattern Recognition, vol. 2,721-728 (2003), 8 pages.
Duda, et al., "Use of the hough transformation to detect lines and curves in pictures." Communications of the ACM 15, 1,11-15 (1972), 5 pages.
Furukawa, et al., "Accurate, dense, and robust multi-view stereopsis." In Proceedings of IEEE Conference Computer Vision and Pattern Recognition, 1-8 (2007).
Goesele, et al., "Multi-view stereo for community photo collections." In Proceeding of IEEE International Conference in Computer Vision, 1-8 (2007), 8 pages.
Kullback, et al., "On information and sufficiency." Annals of Mathematical Statistics 22,79-86 (1951), 9 pages.
Li, et al., "Lazy snapping." ACM Transactions on Graphics 23, 303-308 (2004), 6 pages.
Zebedin et al., "Fusion of feature- and area-based information for urban buildings modeling from aerial imagery." In Proceedings of the European Conference on Computer Vision (2008).
Muller, et al., "Procedural modeling of buildings." ACM Transactions on Graphics 3, 614-623, (2006) 10 pages.
Scharstein, et al., "A taxonomy and evaluation of dense two-frame stereo correspondence algorithms." International Journal of Computer Vision 47, 1/2/3, 7-42 (2002) 35 pages.
Snavely, et al., "Photo tourism: Exploring photo collections in 3d." ACM Transactions on Graphics 3, 835-846 (2006), 12 pages.
Sun, et al., "Image completion with structure propagation." ACM Transactions on Graphics 24, 861-868 (2005), 8 pages.
Vogiatzis, et al., "Reconstructing relief surfaces." Image and Vision Computing 26, 3, 397-404 (2008), 10 pages.
Weiss, et al., "On the optimality of solutions of the max-product belief propagation algorithm in arbitrary graphs." IEEE Transactions on Information Theory 47, 2, 723-735 (2001), 11 pages.
Wonka, et al., "Instant architecture." ACM Transactions on Graphics 4, 669-677 (2003), 9 pages.
International Search Report for International Application No. PCT/CN2010/000148, mailed May 13, 2010, 4 pages.
Shotton, et al., "Semantic texton forests for image categorization and segmentation". In CVPR, pp. 1-8, Dec. 31, 2008, 8 pages.
Written Opinion for International Application No. PCT/CN2010/000148, mailed May 13, 2010, 5 pages.
International Preliminary Report on Patentability for International Application No. PCT/CN2010/000148, dated Aug. 9, 2011, 6 pages.

\* cited by examiner

GENERATING THREE-DIMENSIONAL MODELS FROM IMAGES

CROSS REFERENCE TO RELATED APPLICATIONS

This application is a US national stage application of PCT Application No. PCT/CN2010/000148, filed Feb. 3, 2010, which claims priority to U.S. Provisional Patent Application Ser. No. 61/202,229, filed on Feb. 6, 2009, and entitled METHOD FOR GENERATING THREE-DIMENSIONAL MODELS FROM IMAGES, the entireties of each of which are hereby incorporated by reference.

TECHNICAL FIELD

The subject disclosure relates to graphical modeling, and more particularly to generating three-dimensional models from images.

BACKGROUND

Driven by markets for games, movies, map services, robotics, navigation, photogrammetry, etc., a strong demand has developed for photo-realistic modeling of structures such as buildings, cities, landscapes, etc. However, conventional modeling of such structures focused on large-scale aerial photography-based city modeling. As a result, when these models are zoomed in to ground level, the visual results that viewers experience can be disappointing, with blurry models with and vague or few details. Moreover, to provide a rewarding user experience, many potential applications demand photo-realistic street-level representation of such structures where most of our daily activities take place.

For instance, current models of cities are often obtained from aerial images as demonstrated by Google™ Earth and Microsoft® Virtual Earth® (three-dimensional) 3D platforms. However, such image-based city modeling methods using aerial images typically cannot produce photo-realistic models at ground level. As a transition solution, Google™ Street-View, Microsoft® Live Street-Side and the like can display captured two-dimensional (2D) panorama-like images with fixed view-points, which solutions can be insufficient for applications that require true 3D photo realistic models such as enabling user interactions with 3D environments. In addition, many conventional methods for generating 3D models from images suffer from various deficiencies.

For example, conventional interactive methods to generate 3D models from images typically require significant user interaction, which cannot be easily deployed in large-scale modeling tasks. As a further example, more automated methods that focus on early stages of the modeling pipeline have not yet been able to produce satisfactory results for graphics applications. Further image-based city modeling methods (e.g., single view methods, interactive multi-view methods, automatic multi-view methods, and so on) suffer from similar or other deficiencies.

In image-based example(s), conventional approaches use images as guide to generate models of architectures interactively. As an example, conventional single-view methods allow creation of models from a single image by manually assigning the depth based on a painting metaphor. In other single image-based examples using manual depth assignment (e.g., such as assigning depth based on a sketching approach), a limited domain of regular façades can be used to highlight the importance of features, such as windows in an architectural setting to create a building. Generally, these methods require intensive user interactions to produce visually pleasing results. As a result, conventional image-based examples can suffer from scaling problems. However, even more sophisticated image-based methods can require manual selection of features as well as require tedious indication of the correspondence in different image views.

For instance, some interactive multi-view examples can use line segment features in images and polyhedral blocks as 3D primitives to interactively register images and to reconstruct blocks with view dependent texture mapping. However, the manual selection of features and the correspondences in different views that is required is tedious. As a result, such methods suffer from scaling difficulties as the number of input images grows.

In further examples, a semi-dense set of reconstructed point clouds can be used to operate in a fronto-parallel reference image of a façade to provide acceptable modeling results. As yet another example, using registered multiple views and extracting major directions by vanishing points can also provide good modeling results. However, these methods continue to involve significant user interactions that make the methods difficult to adopt in large-scale city modeling applications. In some conventional automatic multi-view modeling methods, a 3D modeling architectural modeling method for short image sequences still requires a user to provide intensive architectural rules for Bayesian inferences.

In image-based modeling, it is understood that line features in man-made scenes can be used to facilitate modeling such scenes. For instance, line segments can be used for building reconstruction from registered images by sparse points, and line features can be used for both structure from motion and modeling. However, line features tend to be sparse and geometrically less stable than points.

In other conventional approaches to modeling urban environments, a systematic approach can employ video cameras using real-time video registration while focusing on the global reconstruction of dense stereo results from the registered images. However, the lack of architectural constraints result in many irregularities in the final modeling results.

It is clear that, while some conventional modeling examples can provide acceptable models in the context of regular buildings with simple repetitive façades, irregularities in building characteristics (e.g., such as in a street-side façade) require more sophisticated techniques. Other examples, while having general applicability in the context of irregularities, can be difficult to scale up for large-scale reconstruction due to intense manual interaction. Still other examples can require tedious manual assignment of model parameterizations and point correspondences.

It is thus desired to provide enhanced systems, structures and methodologies for producing three-dimensional models from images that improve upon these and other deficiencies. The above-described deficiencies of typical modeling technologies are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

As used herein, the term "façade" is intended to refer to a prominent visual representation of one or more objects. For example, the term "façade" is typically used to refer to a face of an object, e.g., such as a building, and typically refers to a front face or a surface facing a viewer. However, as used herein, the term "façade" can refer to any number of any type of objects having a prominent visual representation, for example, such as buildings, cities, cityscapes, landscapes, other objects of interest, etc. As further used herein, the terms "data representation of a façade" and "data representing a façade" can refer to information useful for describing physical, visual, or other characteristics of one or more objects that can be represented by a façade.

In various non-limiting embodiments of the disclosed subject matter, systems and methodologies for image-based modeling are described that provide automatic or semi-automatic modeling to generate 3D photo-realistic models (e.g., street-side 3D photo-realistic models) from images, for example, such as images captured along streets at ground level.

For instance, in exemplary implementations, a multi-view semantic segmentation can recognize and segment each image at pixel level into semantically meaningful areas, and provide labels with a specific object class, (e.g., object classes such as building, sky, ground, vegetation, car, etc.). Exemplary embodiments can employ a partition scheme that can separate objects (e.g., buildings and so on) into independent blocks using major line structures of a scene. In addition, various implementations can perform an inverse patch-based orthographic composition and structure analysis on a block to facilitate image-based modeling (e.g., image-based 3D façade modeling) that can efficiently regularize noisy and missing reconstructed 3D data. In further non-limiting embodiments, the disclosed subject matter can advantageously produce visually compelling results (e.g., automatically, semi-automatically, or otherwise) by imposing strong priors of building regularity as demonstrated on a typical city example.

Accordingly, various embodiments for image-based modeling are described herein. In one aspect, methodologies for image-based modeling are provided that perform a multi-view semantic segmentation on reconstructed input image data representing a façade to recognize façade structure and segment the façade. In addition, methodologies can further include block partitioning the reconstructed input image data to produce an object block (e.g., a building block) associated with the segmented façade. In a further aspect of exemplary methodologies for image-based modeling, an inverse orthographic composition can be performed on the reconstructed input image data associated with the object block to produce a composed orthographic depth map and a composed orthographic texture for the object block. Moreover, exemplary methodologies can include performing structural analysis and regularization of the composed orthographic depth map and the composed orthographic texture to identify structural elements at a plurality of façade depths for the object block.

Accordingly, in systems that facilitate image-based modeling, the systems can comprise a multi-view semantic segmentation component that produces a semantic segmentation of a façade based on a registered sequence of images associated with the façade, according to various aspects of the disclosed subject matter. In addition, image-based modeling systems can further comprise a partitioning component that block partitions reconstructed image data to determine an object block associated with the semantic segmentation of a façade. In addition, exemplary systems can include an inverse orthographic composition component that can compose an orthographic depth map and texture from the reconstructed image data for the object block, as well as a structural analysis and regularization component that can determine structural elements at various façade depths from the orthographic depth map and texture for the object block.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

While a brief overview is provided, certain aspects of the disclosed subject matter are described or depicted herein for the purposes of illustration and not limitation. Thus, variations of the disclosed embodiments as suggested by the disclosed apparatuses, systems and methodologies are intended to be encompassed within the scope of the subject matter disclosed herein. For example, the various embodiments of the apparatuses, systems and methodologies of the disclosed subject matter are described in the context of city and building models from street-side images. However, as further detailed below, other images and objects can be used, without departing from the subject matter described herein.

As described in the background, conventional image-based modeling techniques can suffer from scaling difficulties due to significant manual user interactions required. As a result, while some conventional techniques can be used to provide photo-realistic 3D models (e.g., photo-realistic 3D models of building) from images, such conventional techniques can become cumbersome when attempting larger scale modeling tasks (e.g., creating photo-realistic 3D models of street-side building façades, city façades, cityscapes, etc.).

Figure 1:
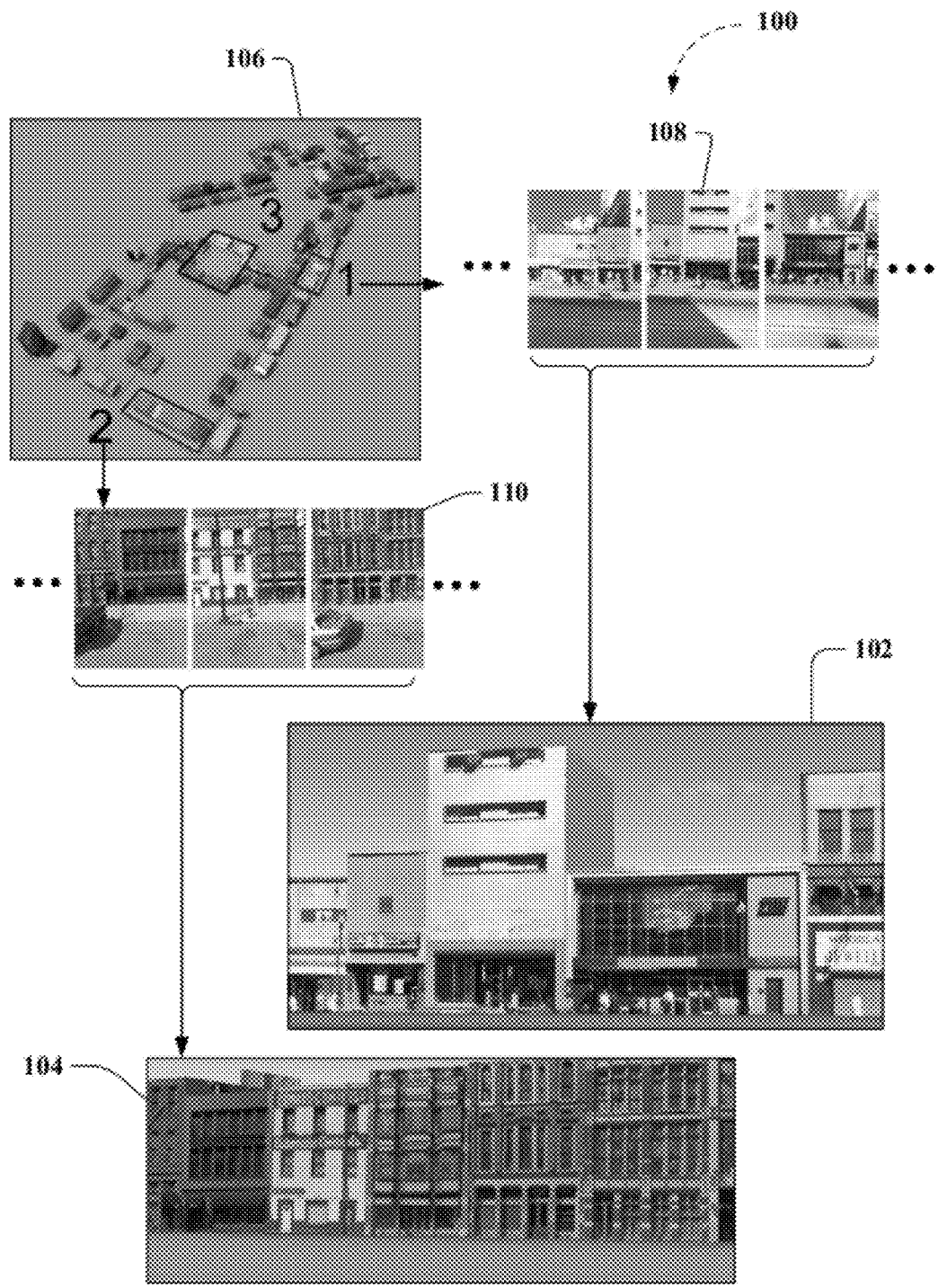
FIG. 1 depicts non-limiting image-based modeling examples, for which implementations of the disclosed subject matter can applied.
Figure 28:
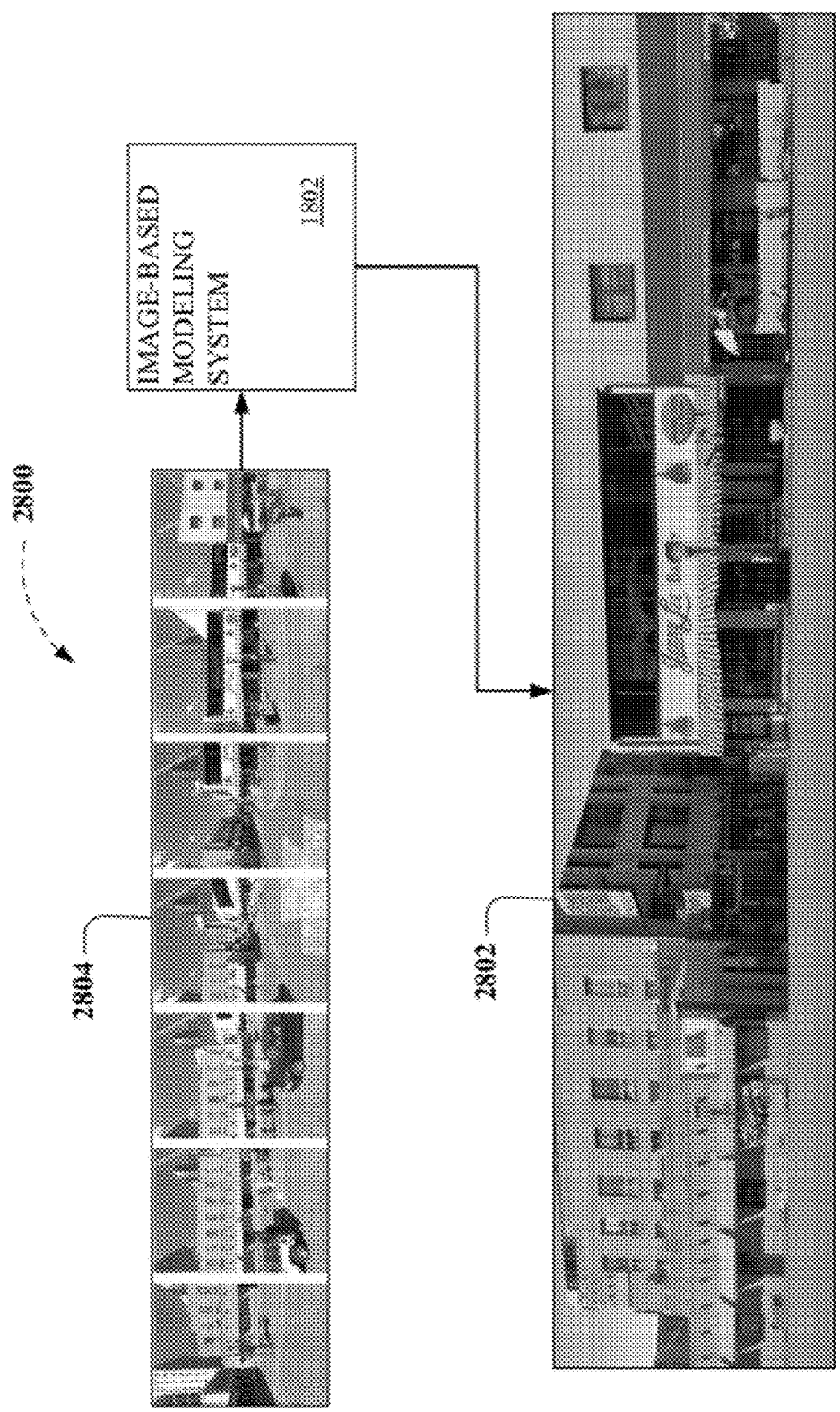

To address these and other deficiencies, the disclosed subject matter provides systems and methodologies for image-based modeling. For example, FIG. 1 depicts non-limiting image-based modeling examples 100, for which implementations of the disclosed subject matter can applied. For instance, two close-up street-side views 102 and 104 of a modeled city area 106 are depicted as 3D models automatically generated from respective series of input images 108 and 110. A close-up street-side view as labeled 3 in modeled city area 106, is further described with regard to FIG. 28. In various non-limiting embodiments of the disclosed subject matter, systems and methodologies for image-based modeling are described that provide automatic or semi-automatic modeling to generate 3D photo-realistic models (e.g., street-side 3D photo-realistic models) from images, for example, such as images captured along streets at ground level.

For instance, in various aspects, a multi-view semantic segmentation can recognize and segment each image at pixel level into semantically meaningful areas, and provide labels with a specific object class, (e.g., object classes such as building, sky, ground, vegetation, car, etc.). In exemplary embodiments, a partition scheme can separate objects (e.g., buildings and so on) into independent blocks using major line structures of a scene. In addition, various embodiments can employ an inverse patch-based orthographic composition and structure analysis on a block to facilitate image-based modeling (e.g., image-based 3D façade modeling) that can efficiently regularize noisy and missing reconstructed 3D data. In various embodiments, the disclosed subject matter can advantageously produce visually compelling results (e.g., automatically, semi-automatically, or otherwise) by imposing strong priors of building regularity as demonstrated on a typical city example.

Image-Based Modeling Overview

Figure 2:
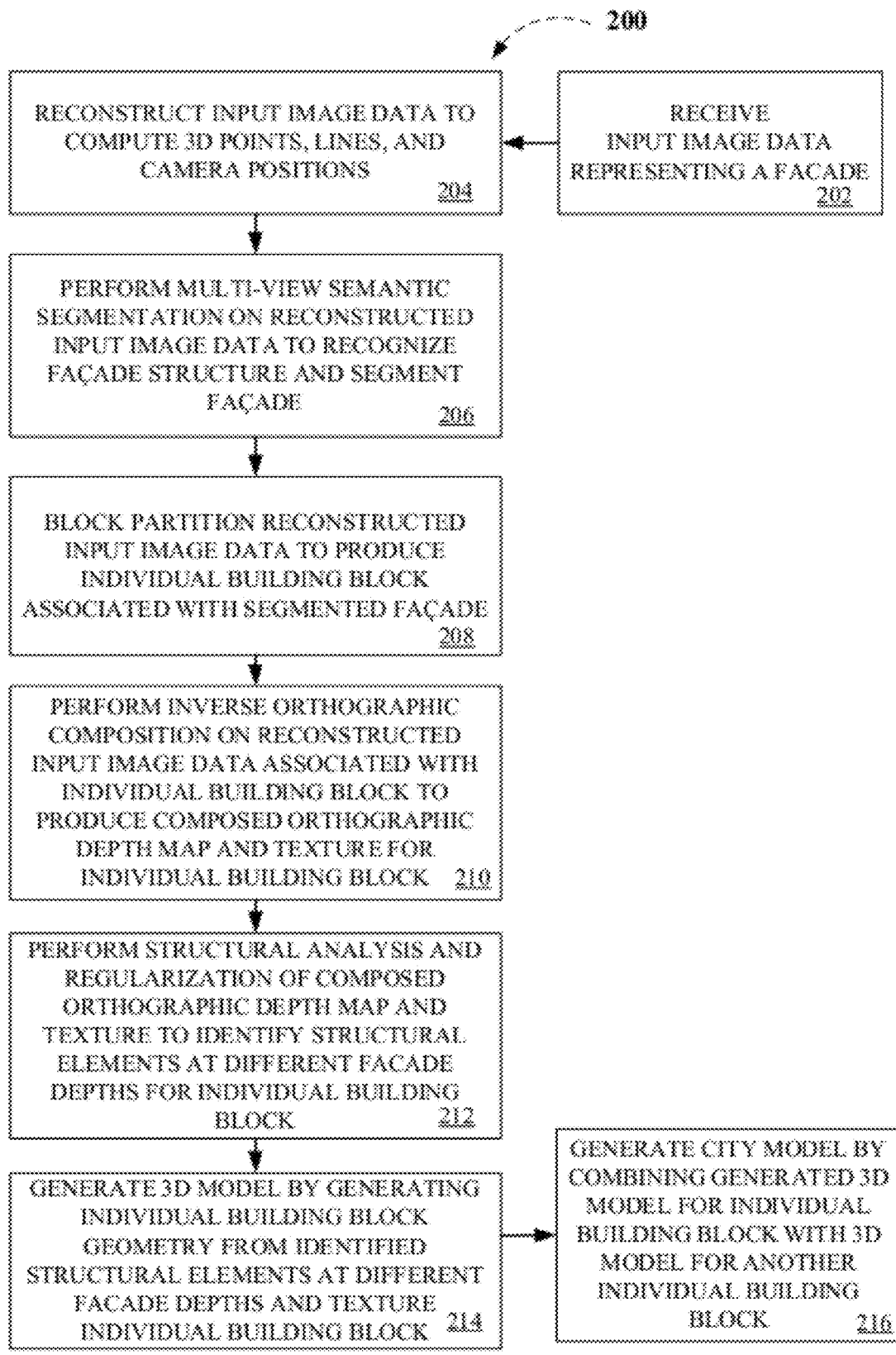
FIGS. 2 and 3 depict various aspects of exemplary non-limiting methodologies for image-based three-dimensional (3D) modeling.
Figure 3:
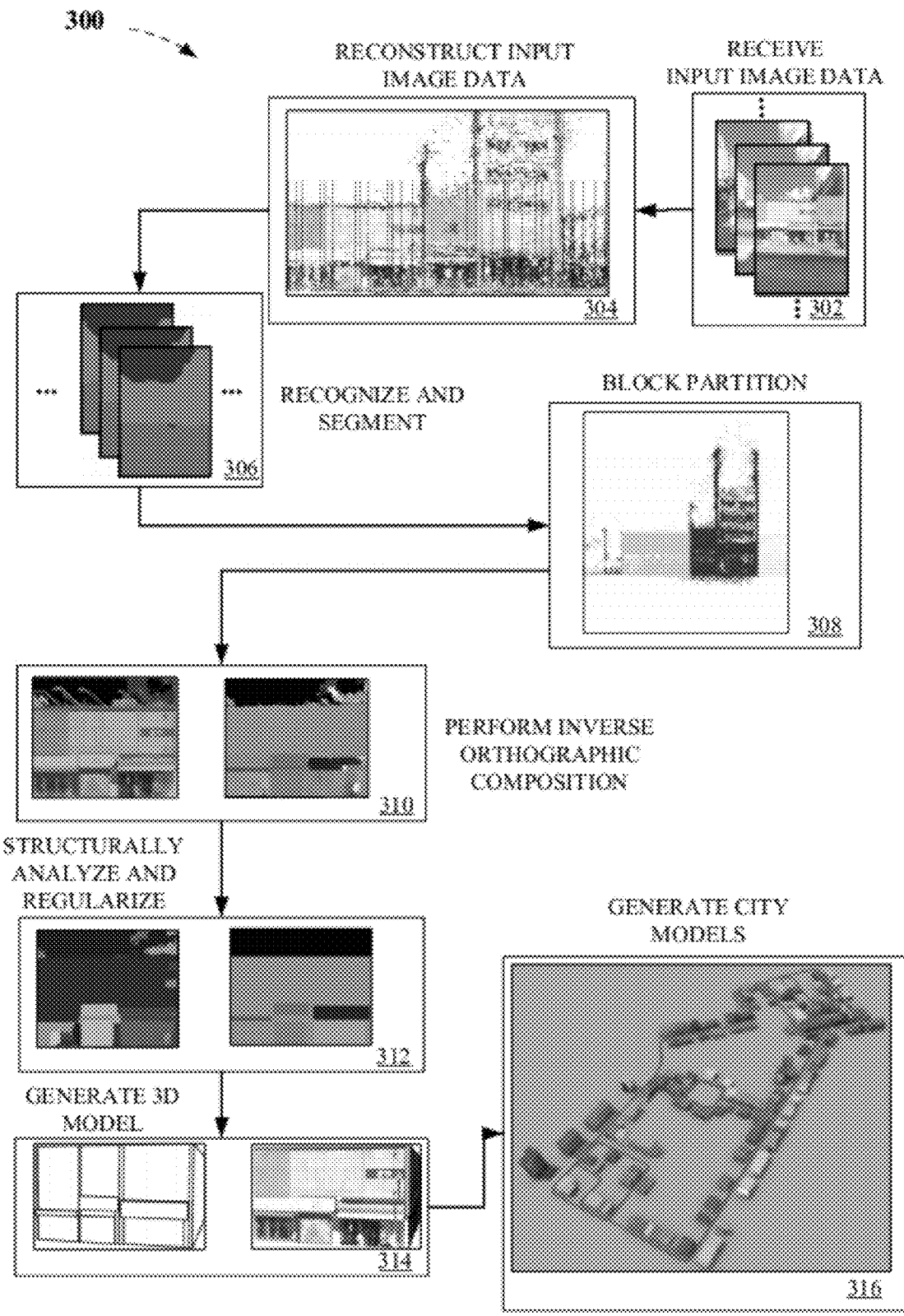

FIGS. 2 and 3 depict various aspects of exemplary non-limiting methodologies for image-based 3D modeling. It can be understood that façade and architecture modeling can use registered images. In computer vision, sets of data acquired by sampling the same scene or object at different times, or from different perspectives, will be in different coordinate systems. As used herein, image registration is intended to be understood as a process of transforming different sets of data related to the same scene or object into one coordinate system. Registration can enable comparing or integrating the data obtained from different measurements. As described above, various embodiments of the disclosed subject matter facilitates automatic or semi-automatic 3D model reconstruction for objects (e.g., objects such as buildings, façades, etc.) from received, collected, stored, etc. images 202 (302) as input image data (e.g., street-side images). For instance, at 202 (302), input image data representing a façade can be received. In addition, according to a further aspect, exemplary methodologies 200 and 300 for image-based modeling can include reconstructing input image data (e.g., an image sequence) using conventional algorithms (e.g., structure from motion algorithms, etc.) to compute 204 (304) a set of semi-dense points, vertical and horizontal line segments, and camera positions.

In addition, at 206 (306), a multi-view semantic segmentation on reconstructed input image data can be performed to recognize façade structure and segment the façade. For instance, from the reconstructed sequence of the input images, methodologies 200 and 300 can further include segmenting 206 (306) input images per pixel into semantically meaningful regions. For example, at 206 (306) input images can be segmented on a per pixel basis by a supervised learning schema into semantically meaningful regions that can be labeled (e.g., labeled as building, sky, ground, vegetation, car, etc.). Methodologies 200 and 300 for image-based modeling can further include optimizing at 206 (306) the classified pixels across multiple registered views to produce a coherent semantic segmentation. Thus, according to various embodiments, the disclosed subject matter can include performing a supervised multi-view semantic segmentation that can recognize and segment input images (e.g., input street-side images) into areas according to different object classes of interest (e.g., building, sky, ground, vegetation, car, etc.).

In further non-limiting embodiments, methodologies 200 and 300 can include, partitioning 208 (308) all or substantially all of the whole sequence into blocks. For instance, at 208 (308), reconstructed input image data can be block partitioned to produce individual building blocks associated with the segmented façade. Advantageously, such blocks can represent individual objects such as building blocks that can be modeled independently and the coordinate frame can be further aligned with major orthogonal directions for a block. As a result, according to further non-limiting embodiments, the disclosed subject matter can include systematically partitioning a sequence, or a subset thereof, to separate buildings into independent blocks, for example, by using one or more major man-made line structures of a scene.

In addition, at 210 (310), methodologies 200 and 300 can include performing an inverse orthographic composition at 210 (310) and shape-based analysis that can efficiently regularize missing and noisy 3D data with strong architectural priors. For instance, an inverse orthographic composition on reconstructed input image data associated with individual building block can be performed to produce a composed orthographic depth map and a composed orthographic texture for an individual building block.

Figure 17:
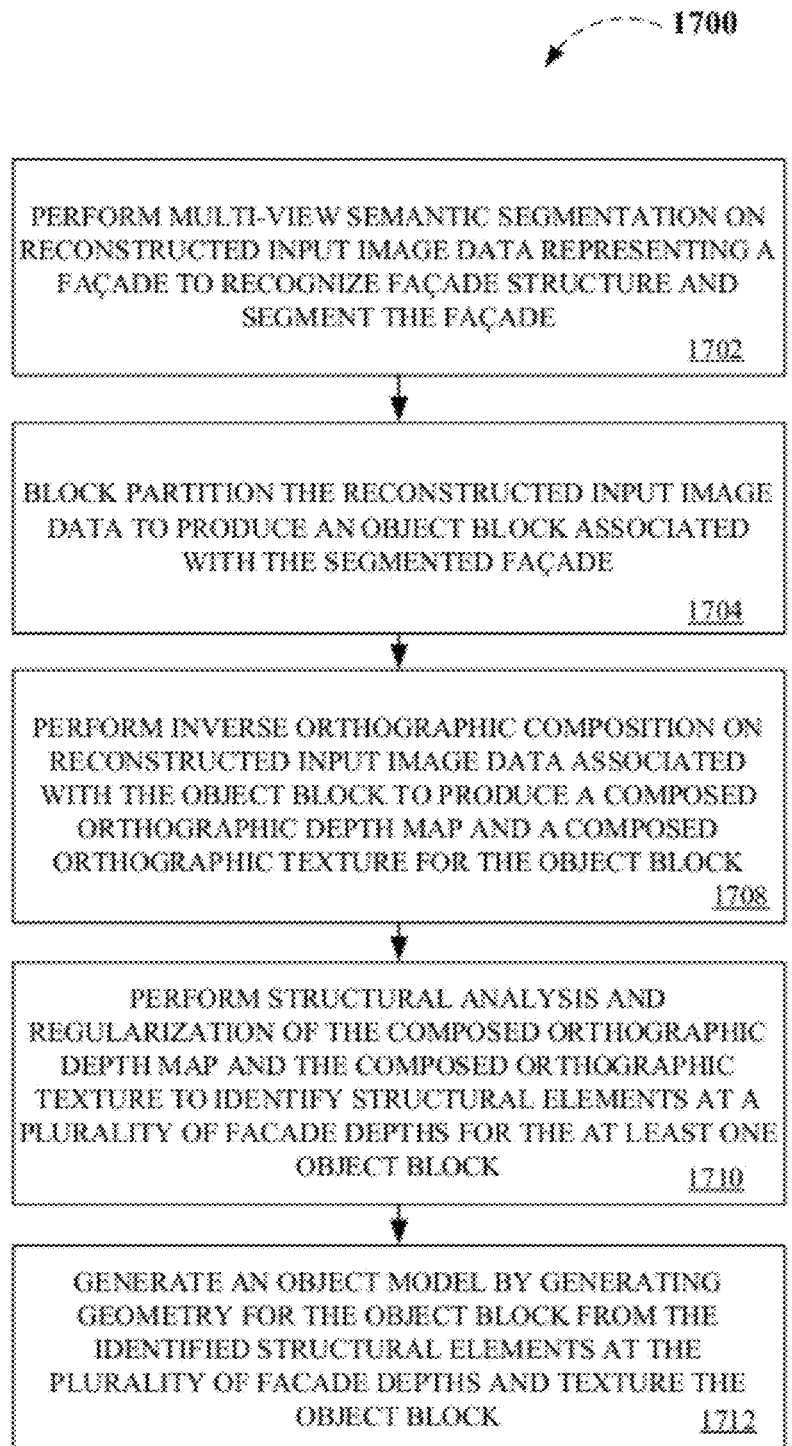
FIG. 17 depicts a flowchart demonstrating various aspects of exemplary non-limiting methodologies that facilitate image-based modeling.

At 212 (312), methodologies 200 and 300 can further include performing structural analysis and regularization of composed orthographic depth map and texture to identify structural elements at different façade depths for individual building block Accordingly, additional non-limiting embodiments can include analyzing façade structure and modeling to produce visually pleasing models (e.g., building models) automatically. At 214 (314), methodologies 200 and 300 can also include generating a 3d model by generating individual building block geometry from identified structural elements at different façade depths and texturing the individual building block, according to further non-limiting implementations. In addition, at 216 (316). various non-limiting embodiments of methodologies 200 and 300 can further include generating a city or façade model by combining or merging a generated 3d model for an individual building block with a second 3d model for another individual building block. Further non-limiting embodiments of image-based modeling methodologies and systems are described in additional detail below, particularly regarding FIGS. 17-18.

Preprocessing

Figure 4:
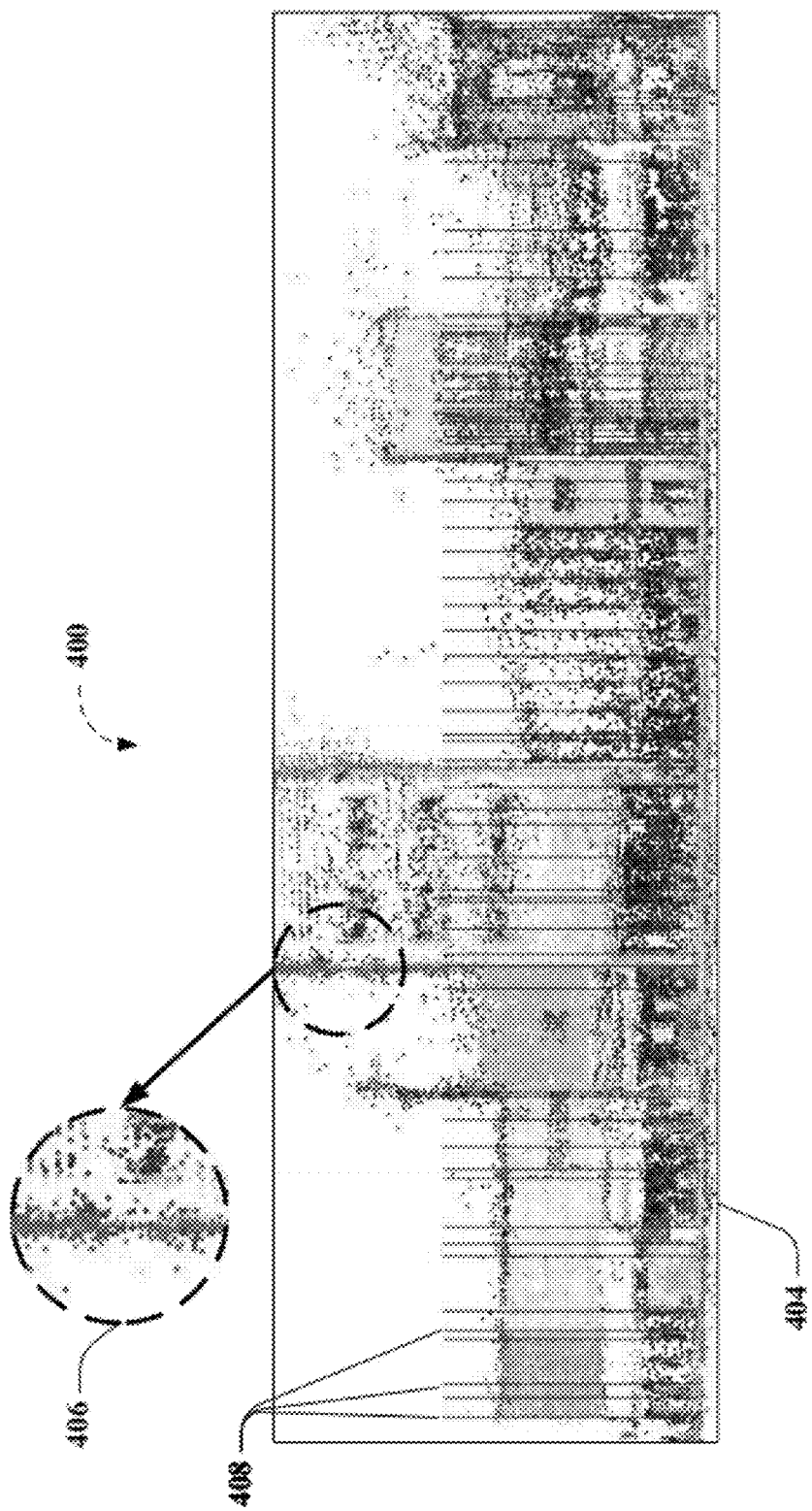
FIG. 4 depicts various aspects of image preprocessing in which reconstructed 3D points and vertical lines are shown in detail for exemplary non-limiting methodologies for image-based 3D modeling.

FIG. 4 depicts various aspects of image preprocessing 400 in which reconstructed 3D points and vertical lines are shown in detail 404 for exemplary non-limiting methodologies 200 and 300 for image-based 3D modeling. For instance, a set of computed points (e.g., a set of semi-dense points) of an exemplary image sequence reconstruction are depicted in zoomed in detail 406, and a subset of computed vertical lines 408 for an individual block are indicated. For example, consider street-side images captured by a camera mounted on a moving vehicle along the street and facing building façades, such vehicles can be equipped with Global Position System/Inertial Navigation System (GPS/INS) that can be calibrated with the camera. According to an aspect of various non-limiting embodiments, exemplary methodologies 200 and 300 for image-based modeling can include reconstructing an image sequence using conventional algorithms (e.g., structure from motion algorithms, etc.) to compute 204 (304) a set of semi-dense points, vertical and horizontal line segments, and camera positions.

Thus, according to various aspects a semi-dense structure from motion can allow for automatically computing semi-dense point clouds (e.g., shown in detail in 406) and camera positions. Advantageously, a quasi-dense approach utilized by exemplary implementations can provides a sufficient density of points that are globally and optimally triangulated in a bundle-like approach. It can be understood that camera pose data from GPS/INS per view can further improve the robustness of structure from motion and can efficiently facilitate large-scale modeling (e.g., city modeling and so on). Thus, for the purposes of illustration and not limitation, a reconstructed sequence, according to various aspects of the disclosed subject matter can be a set of semi-dense reconstructed 3D points and a set of input images with registered camera poses.

As further described above, according to various non-limiting embodiments, exemplary methodologies 200 and 300 for image-based modeling can include computing 204 (304) vertical and horizontal line segments. For example, conventional Canny edge detection can be performed 204 (304) on images, and connected edge points can be linked together to form line segments. The resulting line segments can be grouped into vertical line segments (e.g., 408) and horizontal line segments.

For instance, Random Sample Consensus (RANSAC) is an iterative method to estimate parameters of a mathematical model from a set of observed data which contains outliers. It is a non-deterministic algorithm in the sense that it produces a reasonable result only with a certain probability, with this probability increasing as more iterations are allowed. A typical basic assumption is that the data comprises data points whose distribution can be explained by some set of model parameters, and outliers, which are data that do not fit the model, in addition to being subjected to noise. For example, outliers can come, e.g., from extreme values of the noise or from erroneous measurements or incorrect hypotheses about the interpretation of data. RANSAC typically assumes that, given a set of inliers (e.g., usually a small set), there exists a procedure which can estimate the parameters of a model that optimally explains or fits this data.

Accordingly, above-described grouping of line segments can be carried out by checking at 204(304) whether they go through the common vanishing point using a RANSAC schema. Advantageously, a semi-dense point matching information between each pair of images from the previous computation of structure from motion (SFM), enables the matching of the detected line segments can be obtained, according to various aspects of the disclosed subject matter. In addition, pair-wise matching of line segments can be extended to the whole sequence. It can be understood that as a camera is moving laterally over the ground, it can be difficult to reconstruct horizontal lines in 3D space due to lack of the horizontal parallax. As a result, various embodiments can reconstruct at 204(304) those vertical lines that can be tracked over more than three views. Furthermore 3D vertical lines whose directions are consistent with each other inside RANSAC framework can be retained at 204(304), according to an aspect, and other outlier vertical lines can be removed, according to further aspects.

Segmentation

Figure 5:
FIGS. 5-6 depict aspects of recognition and segmentation for which exemplary non-limiting implementations of the disclosed subject matter have been applied.
Figure 6:
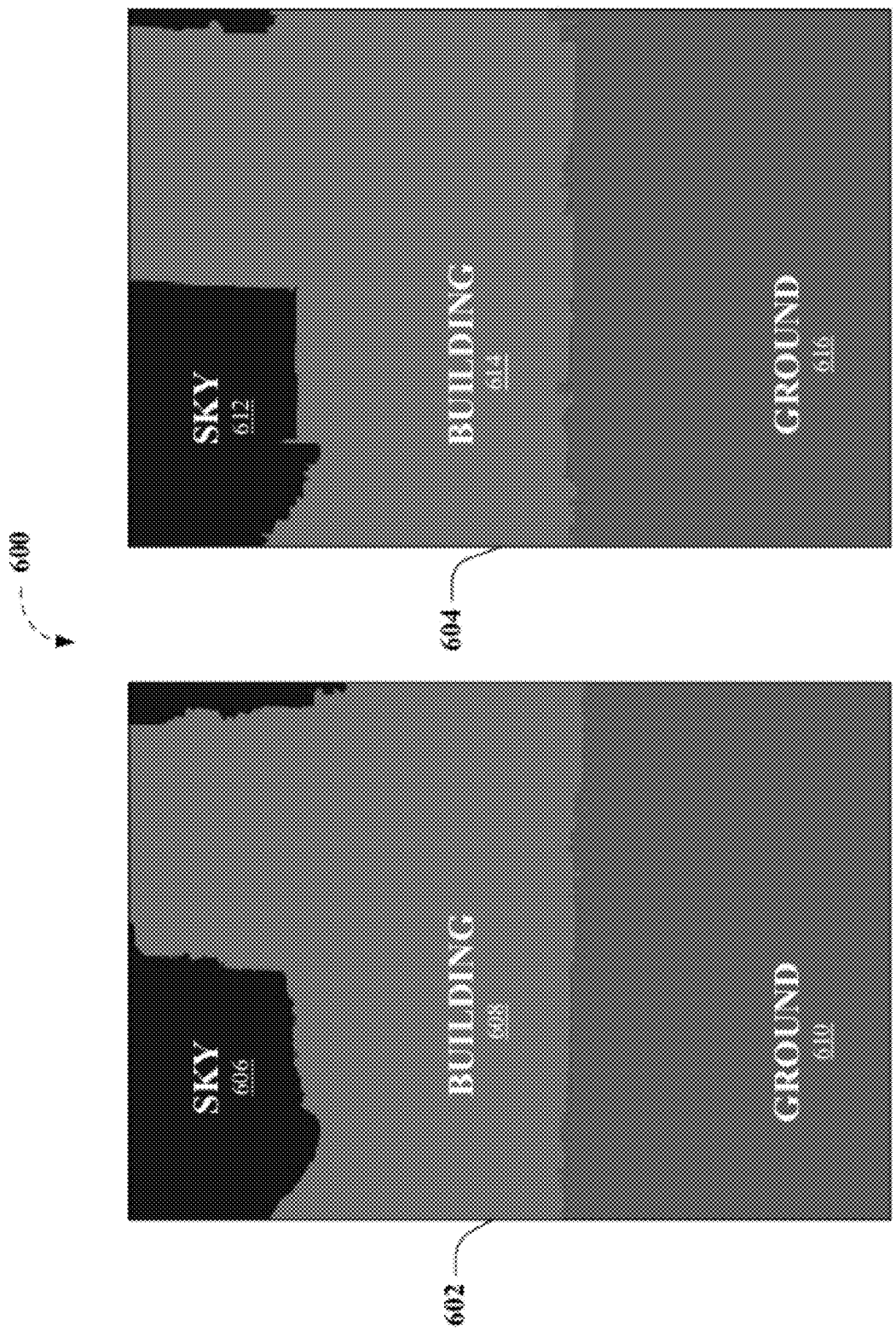

As described above, regarding methodologies 200 and 300, for a reconstructed sequence of images, regions showing an object of interest (e.g., building regions) from all images can be recognized and segmented at 206 (306). FIGS. 5-6 depict aspects 500, 600 of recognition and segmentation for which exemplary non-limiting implementations of the disclosed subject matter have been applied. For instance, FIG. 5 depicts one input image and corresponding over-segmented patches 504. FIG. 6 depicts recognition on a per pixel basis 602 and corresponding segmentation 604 according to various non-limiting implementations of the disclosed subject matter.

For instance, according to various embodiments, at 206 (306), a supervised class recognition can facilitate recognizing and segmenting regions showing an object of interest (e.g., building regions) from images. For example, a pixel-level classifier from a labeled image database can be trained to recognize and distinguish a number of object classes (e.g., object classes, such as building, sky, ground, vegetation, car, etc., according to an aspect). To characterize an image feature, various embodiments of the disclosed subject matter can use textons that can be effective in categorizing materials and general object classes. In an exemplary non-limiting embodiment, a multi-dimensional filter-bank (e.g., a 17 dimension filter-bank, including 3 Gaussians, 4 Laplacian of Gaussians (LoG) and 4 first order derivatives of Gaussians) can be used to compute responses on both training and testing images at pixel level. Textons can then be obtained from the centroids by K-means clustering on the responses of the filter-bank.

Because nearby images in a testing sequence can be assumed to be similar, various embodiments of the disclosed subject matter can save computation time and memory space, by running a reduced subset of texton clustering over all or substantially all of the whole sequence. As a result, various implementations can pick up one out of six images for obtaining the clustered textons. According to further embodiments, a texture-layout descriptor can be adopted to extract one or more features for classifier training based in part on texton identification, because a texture-layout descriptor can successfully recognize and segment images of general classes.

Thus, dimensions of the descriptor can correspond to a pair [r,t] of an image region (r) and a texton (t), with region r relative to a given pixel location as a rectangle chosen (e.g., randomly chosen) within a rectangular window of ±100 pixels, according to a non-limiting aspect. According to various embodiments, a response in terms of $v_{[r,t]}(i)$ at the pixel location i can be defined as the proportion of pixels under regions r+i that have the texton t, for example, according to Equation 1.

$$v_{[r,t]}(i) = \Sigma_{j \in (r+i)} [T_j = t] / size(r) \quad \text{(Eqn. 1)}$$

As described above, regarding methodologies 200 and 300, according to various embodiments, the disclosed subject matter can include performing a supervised multi-view semantic segmentation that can recognize and segment input images (e.g., input street-side images) into areas according to different object classes of interest (e.g., building, sky, ground, vegetation, car, etc.) at 206 (306). Various non-limiting implementations can employ a classifier at 206 (306) to facilitate recognition and segmentation into areas according to different object classes of interest (e.g., building, sky, ground, vegetation, car, etc.).

Thus, in further non-limiting embodiments, a Joint Boost algorithm can be employed at 206 (306), which can iteratively select discriminative texture-layout filters as weak learners, and can combine them into a strong classifier of the form as in Equation 2.

$$H(l, i) = \sum_m h_i^m(r) \quad \text{(Eqn. 2)}$$

For instance, each weak learner $h_i$ (l) can be defines as a decision stump based on the response $v_{[r,t]}(i)$ of the form as in Equation 3

$$h_i(l) = \begin{cases} a[v_{[r,t]}(i) > \theta] + b & l \in C \\ k^l & l \notin C \end{cases} \quad \text{(Eqn. 3)}$$

For those classes that share the feature $l \in X$, the weak learner can give $h_i(l) \in \{a+b, b\}$ depending on the comparison of feature response to a threshold $\theta$. For classes not sharing the feature, $l \notin X$, the constant $k^l$ can ensure that unequal numbers of training examples of each class do not adversely affect the learning procedure to a significant degree. In addition, sub-sampling and random feature selection techniques can be used for iterative boosting, according to further non-limiting embodiments of the disclosed subject matter. Furthermore, estimated confidence values can be reinterpreted as a probability distribution using a softmax transformation as in Equation 4:

$$P_g(l, i) = \frac{\exp(H(l, i))}{\sum_k \exp(H(l, k))} \quad \text{(Eqn. 4)}$$

According to an aspect, a classifier as described can be advantageously trained on a predetermined subset of the full labeled data, which can be computationally large, to enhance performance and speed. For example, according to exemplary implementations, a subset of labeled images that are closest to a given testing sequence can be used to train a classifier, in order to guarantee the learning of reliable and transferable knowledge. In addition, a gist descriptor can be employed to characterize distance between an input image and a labeled image, because the gist descriptor can efficiently retrieve images of similar scenes in semantics, structure, and geo-locations, for example. For example, in further non-limiting embodiments, a gist descriptor can be employed for each image with 4 by 4 spatial resolution where each bin can contain an average response to steerable filters in 4 scales with 8, 8, 4 and 4 orientations respectively in that image region. After distances between labeled images and input images of the testing sequence are computed, the 20 closest labeled images can be chosen from a database as training data for the sequence by nearest neighbors classification.

As a camera is usually kept approximately straight in capturing images, it is therefore possible to learn approximate location priors of each object class. For instance, in a street-side image as described above, for example, the sky (606/612) always appears in the upper part of the image, the ground (610/616) in the lower part, and the buildings (608/614) in-between. As a result, various embodiments of the disclosed subject matter can use labeled data to compute the accumulated frequencies of different object classes $P_l(l, i)$. Moreover, as a camera typically moves laterally along a street in capturing street-side images, a pixel at the same height in the image space should have the same chance of belonging to the same class. Thus, the disclosed subject matter can simply accumulate frequencies in the vertical direction of the image space, according to an aspect.

As further described above regarding FIGS. 2-3, according to various embodiments, the disclosed subject matter can include performing a supervised multi-view semantic segmentation at 206 (306) that can recognize and segment input images (e.g., input street-side images) into areas according to different object classes of interest (e.g., building, sky, ground, vegetation, car, etc.). It can be understood that for a multi-view semantic segmentation, a per-pixel recognition can result in a semantic segmentation of each input image that is noisy or non-optimized in a coherent manner for the entire reconstructed sequence. Because the testing sequence images have been reconstructed by SFM, various embodiments can utilize point matching information between multiple views to impose segmentation consistency.

Figure 7:
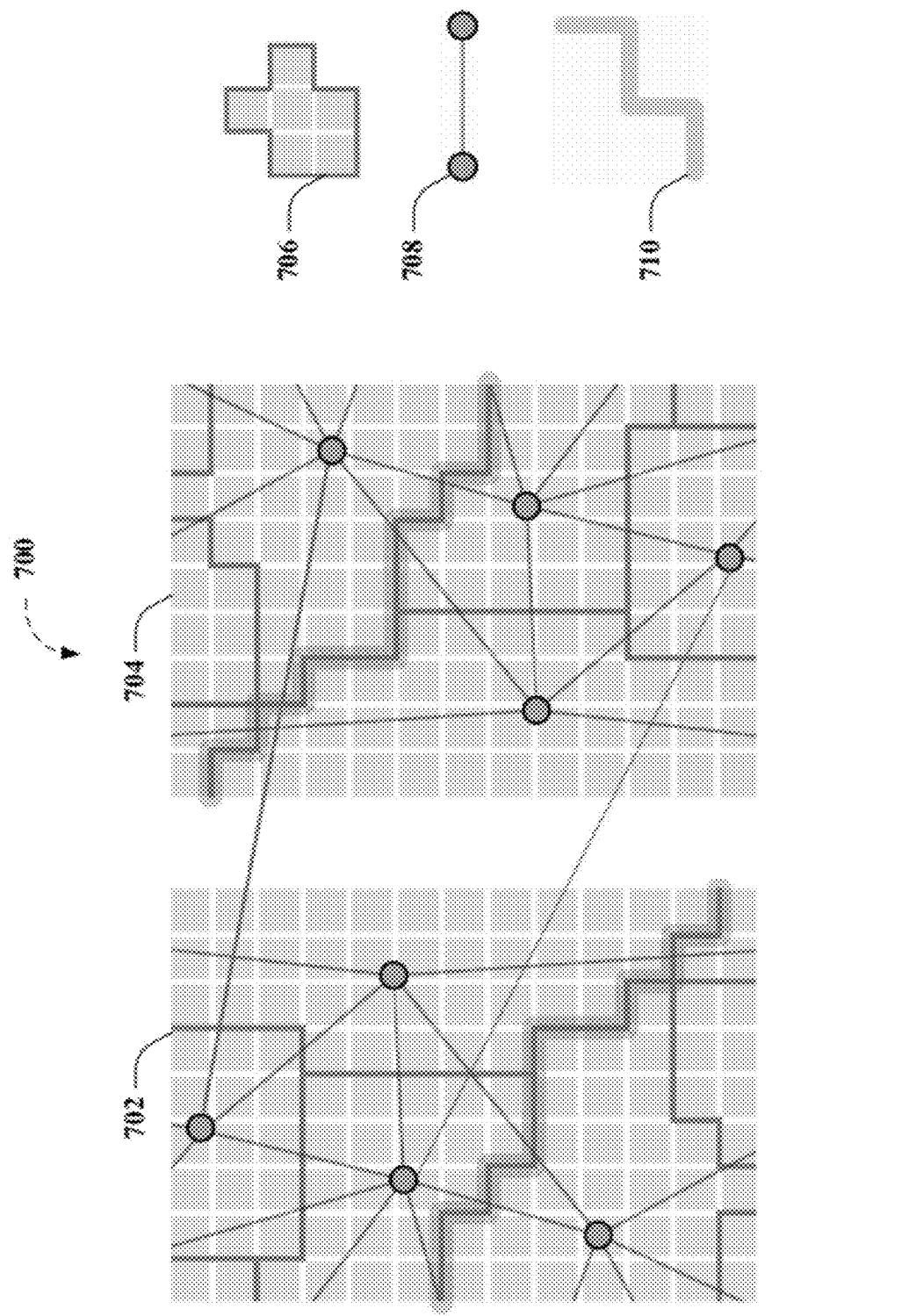
FIG. 7 illustrates a schematic block diagram of exemplary non-limiting graph topology for multi-view semantic segmentation, according various aspects of the disclosed subject matter.

FIG. 7 illustrates a schematic block diagram of exemplary non-limiting graph topology 700 for multi-view semantic segmentation, according various aspects of the disclosed subject matter, in which graph $\Gamma_i$ 702 and graph $\Gamma_j$ 704 are depicted with an exemplary superpixel 706, graph 708, and segmentation lines 710. Thus, for a multi-view semantic segmentation, according to an aspect, each image $I_i$ (e.g., image 502) can be over-segmented using conventional graph-based image segmentation techniques. According to further exemplary implementations, a graph $\Gamma_i = \langle \zeta_i, E_i \rangle$ on the over-segmentation patches 504 can be built for each image 502. For instance, according to an aspect, vertex $v \in \zeta_i$ in the graph can be defined as an image patch or a super-pixel (e.g., 706) in the over-segmentation 504, while the edges E can denote neighboring relationships between super-pixels 706. Then, graphs $\{\Gamma_i\}$ from multiple images in the same sequence can be merged into a large graph F by adding edges between two super-pixels 706 in correspondence but from different images.

According to a further aspect, super-pixels (e.g., 706) $p_i$ and $p_j$ in images $I_i$ and $I_j$ can be said to be in correspondence, for example, if and only if there is at least one feature track $t = \langle (x_u, y_u, i), (x_v, y_v, j), \ldots \rangle$ with projection $(x_u, y_u)$ lying inside the super-pixel (e.g., 706) $p_i$ in image $I_i$, and $(x_v, y_v)$ inside $p_j$ in $I_j$. Referring again to FIG. 7, various non-limiting implementations of the disclosed subject matter can limit graph size, the final graph $\Gamma = \langle \zeta, E \rangle$ can be limited to at most only one edge $e_{ij}$ between any super-pixel (e.g., 706) $p_i$ and $p_j$ in the final graph $\Gamma = \langle \zeta, E \rangle$.

For object segmentation with fine boundaries, various embodiments of the disclosed subject matter can use color cues to characterize the local appearance as an adaptive feature. For instance, according to an aspect, color distribution of all pixels in an image can be approximated by a mixture model of m Gaussians in the color space with mean $u_k$ and covariance $\Sigma_k$. For example, at the beginning, all or substantially all pixel colors in images of the same sequence can be taken as input data points, and K-means can be used to initialize a mixture of 512 Gaussians in Red-Green-Blue (RGB) space. Letting $\gamma_{kl}$ denote the probability that the k-th Gaussian belongs to class l, the probability of vertex $p_i$ having label l is as defined in Equation 5.

$$P_a(l, i) = \sum_{k=1}^{m} g_{kl} N(c_i | u_k, S_k) \quad \text{(Eqn. 5)}$$

To compute $\gamma$, the probability $P_g$ (l, i) can be used solely in a greedy way to obtain an initial segmentation 602 $\{l_i\}$ as shown in FIG. 6. This initial segmentation $\{l_i\}$ can be used to train a Maximal Likelihood estimate for $\gamma$ from Equation 6 and under the constraint $\Sigma_k \gamma_{kl}=1$.

$$g_{kl} \propto \sum_{p_i \in v} [l_i = k] p(c_i | u_k, S_k) \quad \text{(Eqn. 6)}$$

Combining costs from both local adaptive feature and the global feature, the data cost can be defined as in Equation 7.

$$y_i(l_i) = -\log P_a(l,i) - 1_l \log P_l(l,i) - 1_g \log P_g(l,i) \quad \text{(Eqn. 7)}$$

For an edge $e_{ij} \in E_k$ in the same image $I_k$, the smoothness cost can be defined as in Equation 8.

$$y_{ij}(l_i,l_j) = [l_i \neq l_j] \cdot g(i,j) \quad \text{(Eqn. 8)}$$

where $g(i,j) = 1/(\zeta \Pi c_i - c_j \Pi^2 + 1)$ and $\Pi c_i - c_j \Pi^2$ can be defined as the $L_2$-Norm of the RGB color difference of two super-pixels $p_i$ and $p_j$. Note that $[l_i \neq l_j]$ allows to capture the gradient information only along the segmentation 710 boundary, according to various embodiments of the disclosed subject matter. In other words, $y_{ij}$ can be said to be penalizing the assignment to the different labels of the adjacent nodes. For an edge $e_{ij} \in E$ across two images, smoothness cost can be defined as in Equation 9.

$$y_{ij}(l_i,l_j) = [l_i \neq l_j] \cdot 1/|T| g(i,j) \quad \text{(Eqn. 9)}$$

where $T = \{t = \langle (x_u, y_u, i), (x_v, y_v, j), \ldots \rangle\}$ can be defined as the set of all feature tracks with projection $(x_u, y_u)$ inside the super-pixel (e.g., 706) $p_i$ in image $I_i$, and $(x_v, y_v)$ inside $p_j$ in $I_j$. It can be understood that this definition favors two super-pixels 706 having more matching tracks to have the same label, as the cost of having different labels is higher when |T| is larger.

With the constructed graph $\Gamma = \langle \zeta, E \rangle$, the labeling problem can be defined as assigning a unique label $l_i$ to each node $p_i \in \zeta$. A solution $L = \{l_i\}$ can be obtained by minimizing a Gibbs energy such as in Equation 10.

$$E(L) = \sum_{p_i \in v} y_i(l_i) + \rho \sum_{e_{ij} \in \varepsilon} y_{ij}(l_i, l_j) \quad \text{(Eqn. 10)}$$

According to a further aspect, Graph Cut alpha expansion (e.g., a fast approximate energy minimization via graph cuts) can be used to obtain a local optimized label configuration L as in 604 of FIG. 6 within a constant factor of the global minimum, because the defined cost terms satisfy the metric requirement.

Block Partition

In further non-limiting embodiments, methodologies 200 and 300 in can include, partitioning 208 (308) all or substantially all of the whole sequence into blocks. Advantageously, such blocks can represent individual objects such as building blocks that can be modeled independently and the coordinate frame can be further aligned with major orthogonal directions for a block. As a result, according to further non-limiting embodiments, the disclosed subject matter can include systematically partitioning a sequence, or a subset thereof, to separate buildings into independent blocks, for example, by using one or more major man-made line structures of a scene.

Figure 8:
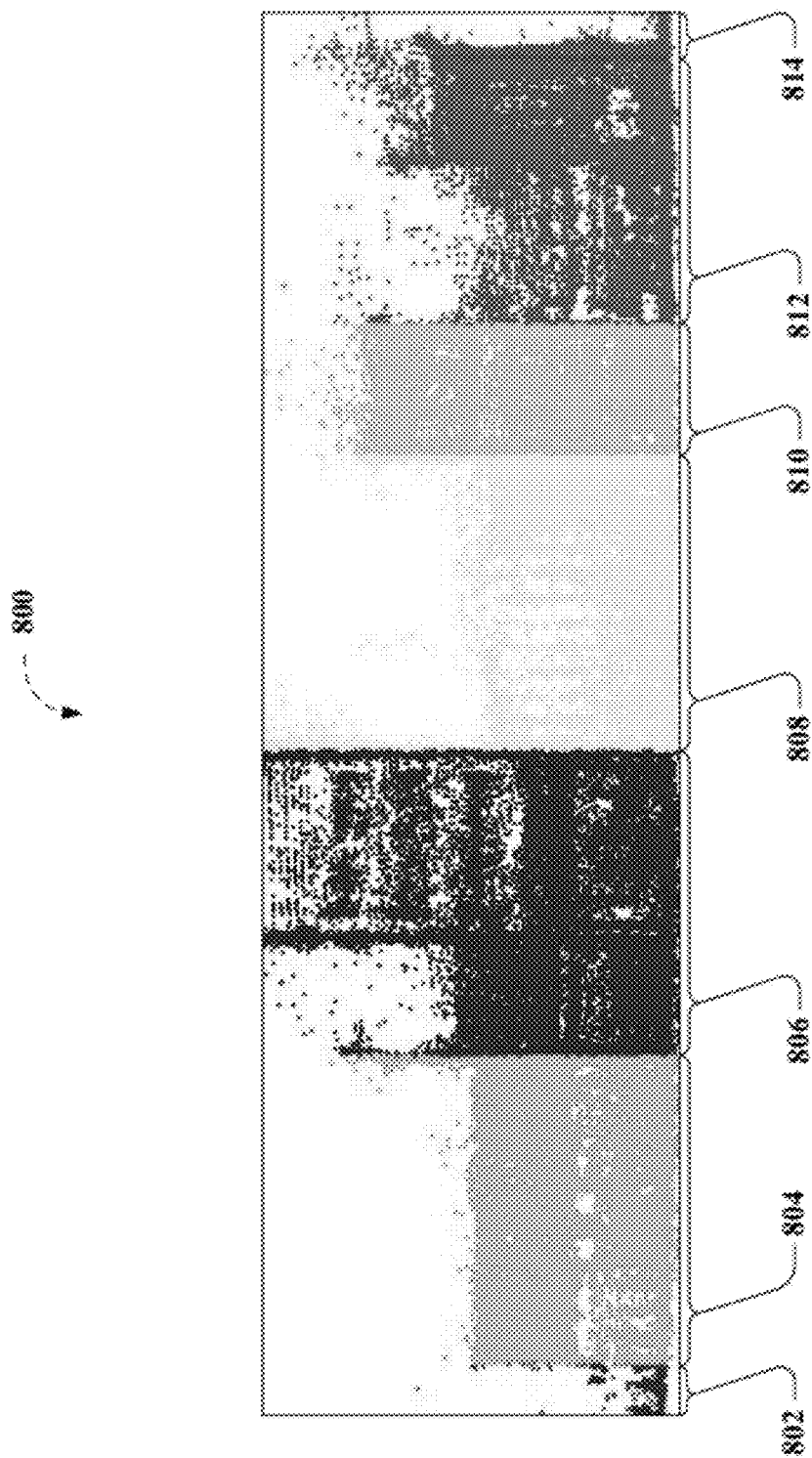
FIG. 8 depicts an exemplary non-limiting building block partition, according to various aspects, in which different blocks are shown.

For example, FIG. 8 depicts an exemplary non-limiting building block partition 800, according to various aspects, in which different blocks are shown as blocks 802, 804, 806, 808, 810, 812, and 814. As described above, the reconstructed sequence can be partitioned into independent building blocks. As a result, each block can be individually modeled. As an urban scene is characterized by the prevalence of man-made structures having vertical and horizontal lines, various embodiments of the disclosed subject matter can use vertical lines (e.g., 408) to partition a sequence into blocks, because they are stable and distinct separators useful for the techniques described herein.

Accordingly, in an aspect, line segments that are projected out of the segmented building regions from the previous section can be removed. Note that the definition of building block is ambiguous and a block may contain any number of buildings. Accordingly, a building block can be roughly defined as a continuous sequence of façades as long as they are sharing the same dominant base plane.

From all or substantially all vertical line segments (e.g., 408), a global vertical direction (e.g., global vertical direction of gravity) can be computed, in various non-limiting embodiments, by taking the median direction of all or substantially all reconstructed 3D vertical lines, found during the preprocessing stage at 204 (304) as described in above regarding FIGS. 2-4. Thus, the y-axis of coordinate system for the reconstructed sequence can be aligned with the estimated vertical direction at 204 (304).

It should be noted that while vertical lines 408 are an important cue as a block separator for separating the scene into natural building blocks, some vertical lines 408 can result in an overly partitioned building block. Consequently, block separators can be carefully selected from vertical lines 408 according to a further aspect of the disclosed subject matter. For example, various non-limiting embodiments of the disclosed subject matter can discriminatively select block separators by selectively avoiding vertical line segments whose extensions crisscrosses with many horizontal line segment, based on the observation that vertical boundaries of a façade usually crisscrosses less horizontal lines (e.g., excluding endpoints), than vertical lines inside the façade region do. As a result, exemplary implementations can compute a score for vertical line 408 segments by accumulating a number of crisscrosses for vertical line 408 segments with horizontal line segments.

Thus, vertical lines 408 can be sorted in ascending order of number of crisscrosses, to facilitate selection of a block separator. According to exemplary non-limiting implementations, an empirically chosen threshold (e.g., selection of the top 15% of lines in every 25 meters) can produce selected lines as candidates for block separators. As can be understood, such a selection can filter out a significant portion of undesirable vertical lines 408. As a result, in exemplary implementations, vertical lines whose projections in the 2D images have edge responses larger than a predefined threshold can be selected. In addition, in further non-limiting implementations, selection of an independent building block can be further constrained by an associated building block width threshold (e.g., a threshold width between 6 meters and 30 meters, so as to further ensure that a sequence is not overly partitioned.

After global vertical alignment in the y-axis, the desired façade plane of the block is vertical or substantially vertical. However, in certain circumstances the desired façade plane may not be parallel to the xy-plane of the coordinate frame. Thus, in yet other non-limiting implementations, vanishing points of horizontal lines in the most fronto-parallel image of the block sequence can be automatically computed to obtain a rotation around the y-axis for alignment of the x-axis with the horizontal direction. Note that, according to an aspect, this can be done locally for each block if there are sufficient horizontal lines in the chosen image. It can be understood that, after these operations, each independent façade can be said to be facing the negative z-axis with x-axis as a horizontal direction from left to right, and y-axis as vertical direction from top to down in their local coordinate system, respectively, according to various non-limiting implementations.

Image-Based Modeling

Figure 9:
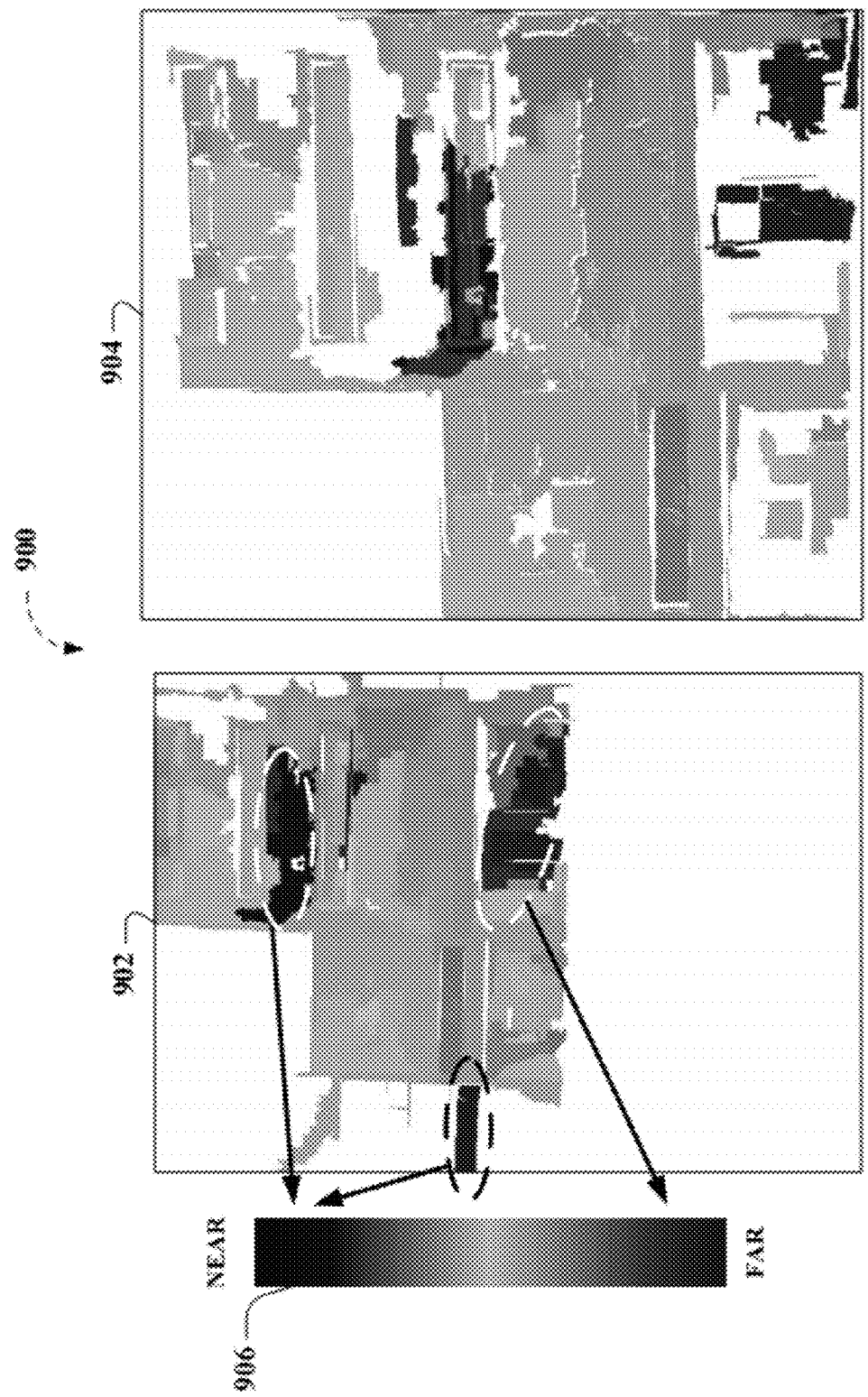
FIGS. 9-11 graphically illustrate concepts of an exemplary inverse orthographic composition according to various aspects of non-limiting methodologies for image-based 3D modeling.
Figure 10:
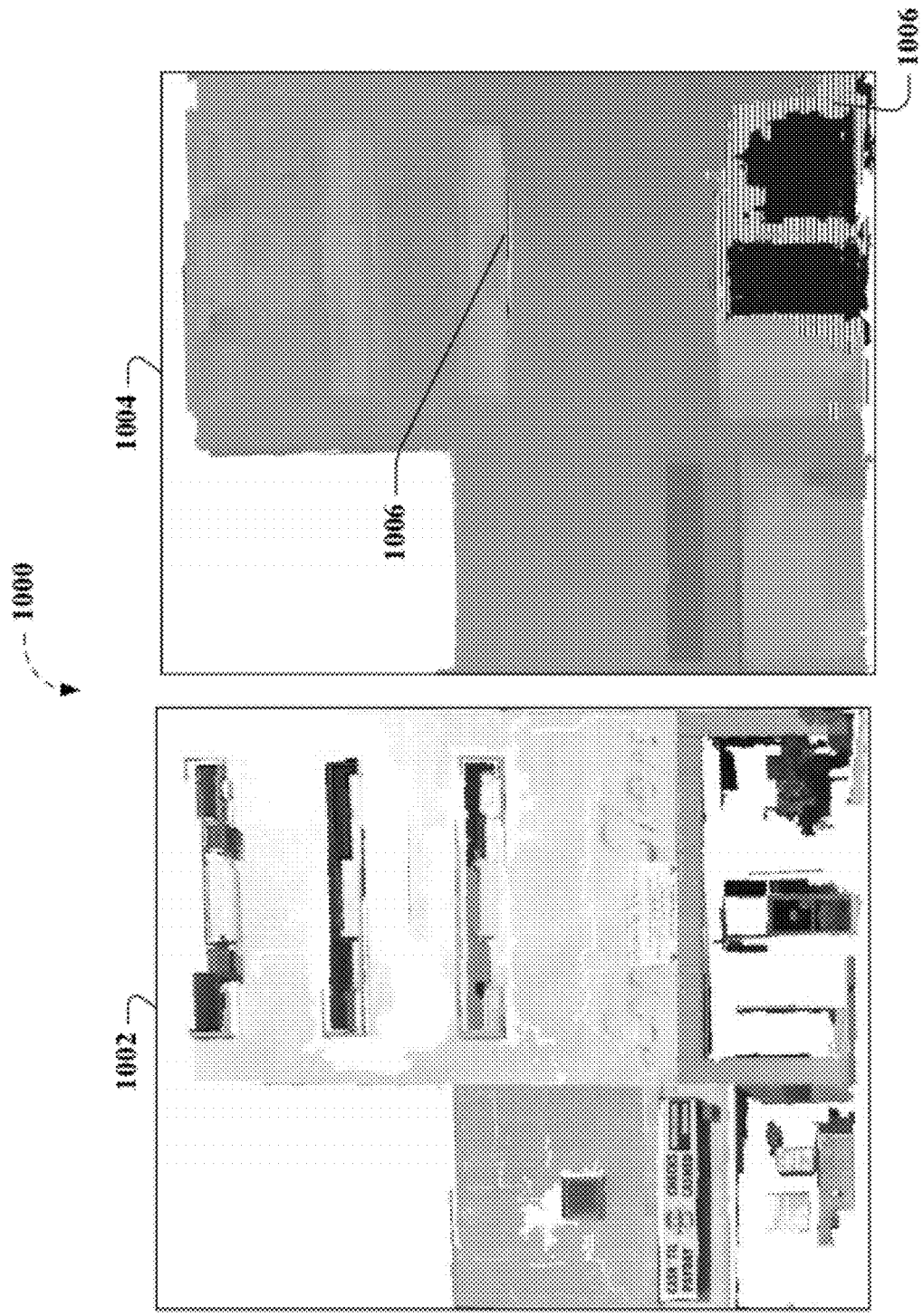
Figure 11:
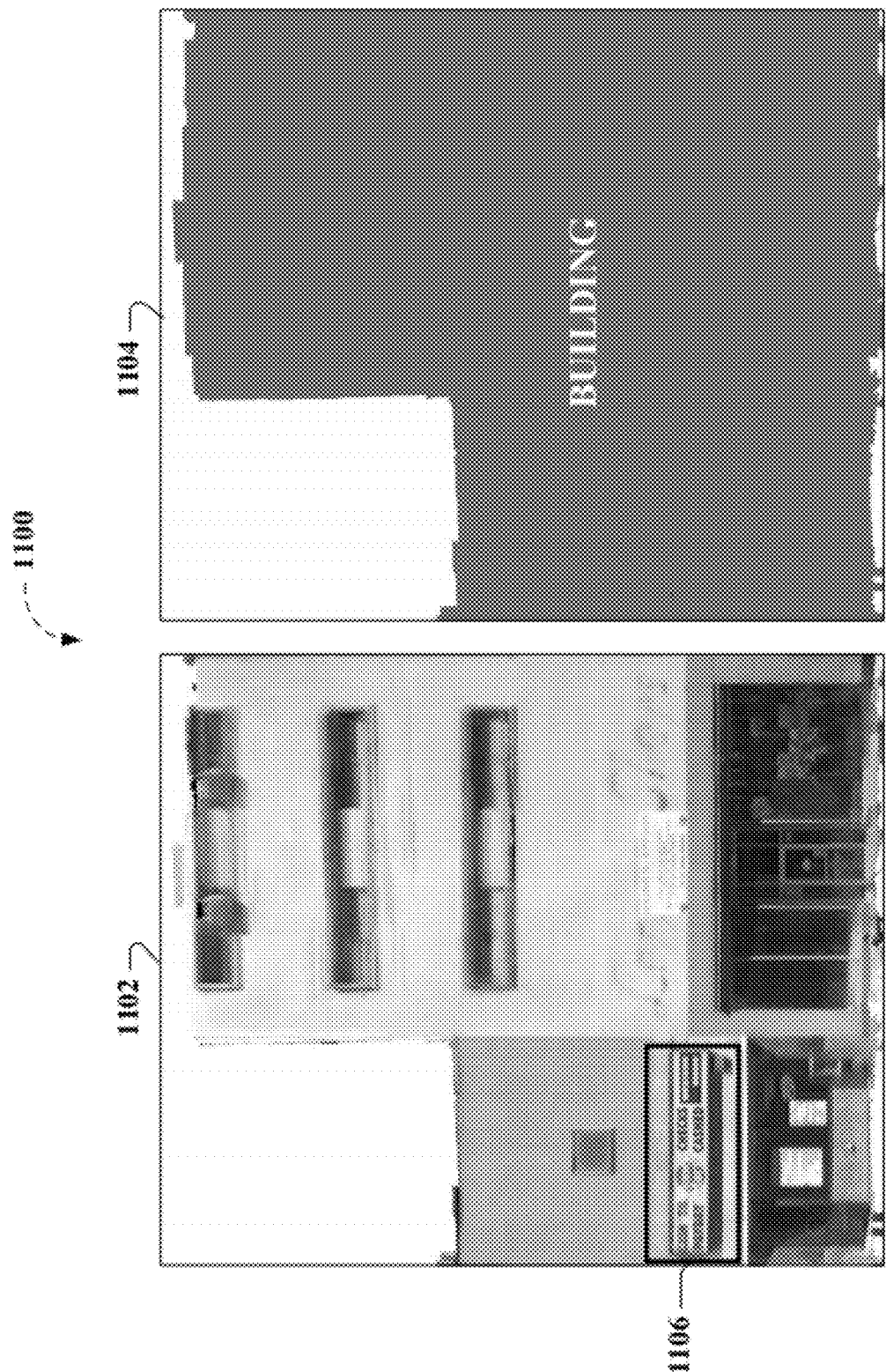

As further described above, regarding FIGS. 2-3, methodologies 200 and 300 can include performing an inverse orthographic composition 310 and shape-based analysis that can efficiently regularize missing and noisy 3D data with strong architectural priors. Accordingly, additional non-limiting embodiments can include analyzing façade structure and modeling to produce visually pleasing models (e.g., building models) automatically. FIGS. 9-11 graphically illustrate concepts of an exemplary inverse orthographic composition 900, 1000, and 1100 according to various aspects of non-limiting methodologies for image-based 3D modeling. For instance, in FIG. 9 an exemplary depth map 902 is depicted in input image space with a corresponding partial orthographic depth map 904 according to one view. In FIG. 10 a corresponding partial orthographic texture 1002 from one view is depicted with a composed orthographic depth map 1004, where unreliably estimated pixels are depicted as regions shaded in horizontal lines 1006. FIG. 11 depicts an orthographic texture composition 1102 with a corresponding orthographic building region composition 1104.

While semantic segmentation (e.g., as depicted in 604) can identify a region of interest, and block partition (e.g., as depicted in 800) can separate the data into different façades (e.g., 802, 804, 806, 808, 810, 812, 814), further aspects of the disclosed subject matter can model each façade. For example, as described, reconstructed 3D points are often noisy and/or missing. Thus, according to various embodiments irrelevant 3D points can be filtered out by semantic segmentation (e.g., as depicted in 604) and block separation (e.g., as depicted in 800). According to further aspects of the disclosed subject matter, structure analysis and modeling can be facilitated by a building regularization schema in the orthographic view of the façade, as further described below.

For instance, according to an aspect, input images of a building block can be over-segmented into patches, for example, as described above regarding 504 in FIG. 5 (e.g., graph-based image segmentation). It can be understood that patch size can be a trade-off between accuracy and robustness. Thus, in exemplary non-limiting implementations, 700 pixels can be designated as minimum patch size for images at a resolution of 640×905 pixels to favor relatively large patches as reconstructed 3D points from images can be noisy.

According to exemplary non-limiting embodiments, normal vectors and center positions of each $p_i$ can be estimated from the set of 3D points $\Pi_i = \{(x_k, y_k, z_k)\}$, which have projections inside $p_i$. As the local coordinate frame of the block is advantageously aligned with the three major orthogonal directions of the building, the computation can be direct according to exemplary embodiments. Letting $\sigma_x^i$, $\sigma_y^i$, and $\sigma_z^i$, be defined as standard deviations of all 3D points in $\Pi_i$ in three directions, the normalized standard deviations $$\hat{\sigma}_x^i = \frac{\overline{S}_x}{s_x^i} \sigma_x^i, \quad \hat{\sigma}_y^i = \frac{\overline{S}_y}{s_y^i} \sigma_y^i,$$

can be computed, where $s_x^i$ and $s_y^i$, can be defined as horizontal and vertical sizes of the bounding box of the patch in the input images. The respective median across all patches can be defined as $\overline{S}_x = \text{median}_i s_x^i$, $\overline{S}_y = \text{median}_i s_y^i$. It can be understood that normalization advantageously avoids bias to a small patch.

As a result, patch $p_i$, according to an aspect, can be regarded as parallel to the façade base plane if $\sigma_z$ is smaller than $\sigma_x^i$ and $\sigma_y^i$. Consequently, all these parallel patches with small $\sigma_z$ contribute to the composition of an orthographic view of the façade, according to an aspect. It can be understood that, orientation of such a patch $p_i$ is aligned with the z-axis, and its position set at the depth $z_i = \text{median}_{(x_j, y_j, z_j) \in p_i} z_j$. One example of such a patch reconstruction resulting in a depth map in input image space 902 is shown in FIG. 9. It should be noted that depth map in input image space 902 as depicted in grayscale is limited in its utility as an illustrative tool. Accordingly, the dashed black or white ellipses are used with arrows to roughly indicated the depth according to depth scale 906. It should be appreciated that other intermediate depths can be colored similarly depending on their respective distance from the mean depth. However, it should be further understood that depth map in input image space 902 is merely provided for illustration and not limitation.

To simplify the representation for irregular shapes of patches, various embodiments of the disclosed subject matter can deploy a discrete 2D orthographic space on the xy-plane to create an orthographic view O of the façade. However, size and position of O on the xy-plane can be determined by the bounding box of the 3D points of a block, and resolution of O can be defined as a parameter (e.g., defined as a parameter set not to exceed 1024×1024), according to an aspect. Thus, a patch can be mapped from its original image space onto this orthographic space as illustrated in a partial orthographic depth map from one view 906 as illustrated in FIG. 9. As a non-limiting example, consider the details presented in Algorithm 1, which can use an inverse orthographic mapping algorithm to avoid gaps.

Algorithm 1 Inverse Orthographic Patching

---

1: for each image $I_k$ visible to the façade do
2:    for each super pixel $p_i \in I_k$ do
3:       if normal direction of $p_i$ parallel with z-axis then
4:          for each pixel (x, y) in the bounding box do
5:             $X \leftarrow (x, y, z_i)^T$    > $z_i$ is the depth of $p_i$
6:             compute projection (u, v) of X to Camera i
7:             if super pixel index of (u, v) in $I_k$ = k then
8:                accumulate depth $z_i$, color, segmentation Theoretically, warped textures of all patches can create a true orthoimage O as each used patch can have a known depth and can be parallel with the base plane. Thus, according to further aspects, for each pixel $v_i$ of the orthoimage O, a set of depth values $\{z_j\}$, a set corresponding of color values $\{c_j\}$ and a set of segmentation labels $\{l_j\}$ can be accumulated. The depth of this pixel can be set to the median of $\{z_j\}$ whose index is $\kappa = \arg \mathrm{median}_j z_j$. Because depth can determine texture color and segmentation label in various non-limiting implementations, $c_\kappa$ and $l_\kappa$, the estimated color and label for the pixel can be used. However, in practice, a small set of estimated points around $z_\kappa$ can be accepted their mean can be used as the color value in the texture composition, according to further non-limiting implementations. Note that in FIG. 10, a corresponding partial orthographic texture 1002 from one view is depicted with a composed orthographic depth map 1004.

As can be understood, content of images can be highly overlapped. Thus, if a pixel is observed only once from one image, it can be very likely that it comes from an incorrect reconstruction. Accordingly, in various embodiments, if a pixel is observed only once from one image, it can be presumed to result from an incorrect reconstruction, and be rejected in a depth fusion process. Moreover, pixels $\{v_i\}$ with multiple observations $\{\{z_j\}i\}$ can be sorted in non-decreasing order according to their standard deviation $\zeta_i = \mathrm{sd}(\{z_j\})$ of depth sets, according to a further aspect of the disclosed subject matter.

Thus, $\zeta(\eta)$ can be defined to be the $\eta|\{v_i\}|$-th element in the sorted $\{\zeta_i\}$. As a result, in various implementations, pixel $v_i$ can be declared to be unreliable if $\zeta_i > \zeta(\eta)$. Note that the value of $\eta$ can come from estimated confidence of the depth measurements. In a further aspect, the value can be scaled by the ratio of the number of 3D points and the total pixel number of O.

Note that when the patches are reconstructed, the semantic segmentation results in the input image space are not used for two reasons. For instance, it can be understood that patches used in reconstruction can be much larger in size than those used for semantic segmentation, which can lead to an inconsistent labeling. Though it is possible to estimate a unique label for a patch, this can have an undesirable side-effect of downgrading the semantic segmentation accuracy. As another example, possible errors in the semantic segmentation can have a further undesirable side-effect—that of over-rejecting patches—which can compromise the quality of the depth estimation.

As a result, according to various non-limiting embodiments of the disclosed subject matter, depth can be reconstructed first, and the segmentation results can be transferred from the input image space to the orthographic view with pixel-level accuracy, for example, as depicted by orthographic building region composition 1104 in FIG. 11. According to further non-limiting embodiments of the disclosed subject matter, the non-building pixels in the orthoimage can be removed according to the segmentation label (e.g., building in 1104), for example, as depicted by orthographic texture composition 1102 in FIG. 11. Note that various exemplary implementations of disclosed composition algorithms for the orthographic depth map are more robust than conventional depth map fusion techniques due in part, for example, to the use of the architectural prior of orthogonality, which advantageously preserves structural discontinuity without over smoothing.

From the composed orthographic depth map 1004 and texture image 1102 for each façade, the task is to identify the structural elements at different depths of the façade to enrich the façade geometry. Thus, according to further aspects of the disclosed subject matter, various embodiments can employ a strong regularization from the architectural priors to cope with irregular, noisy, and missing depth estimations on the façade. For instance, as described, most buildings are governed by vertical and horizontal lines and form naturally rectangular shapes. Thus, in exemplary embodiments, the prior shape of each distinct structure element can be restricted (e.g., restricted to be a rectangle), such as the typical extruding signboard 1106 in FIG. 11.

Figure 12:
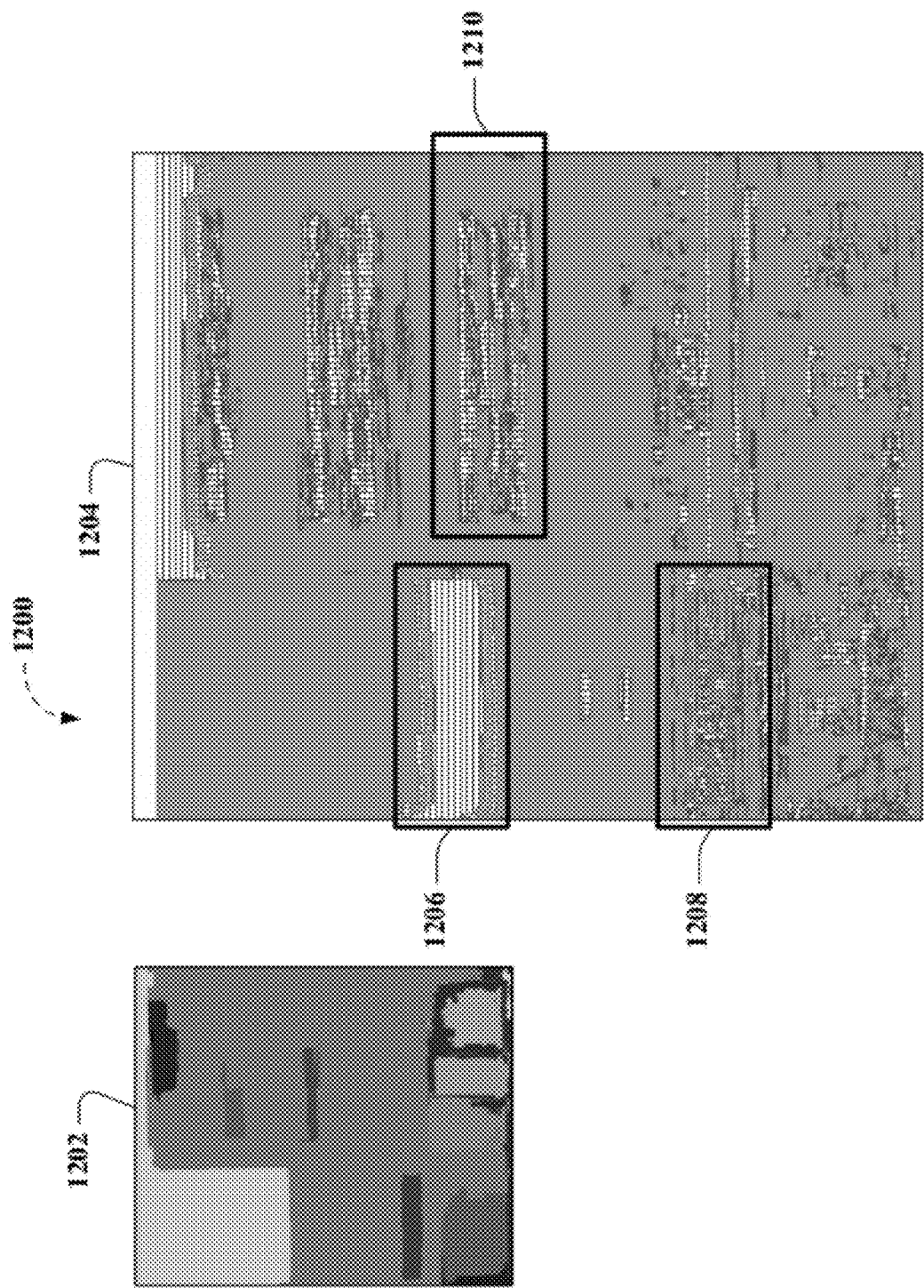
FIGS. 12-15 graphically illustrate concepts of an exemplary structure analysis and regularization for modeling to demonstrate further advantages of various aspects of the disclosed subject matter.
Figure 13:
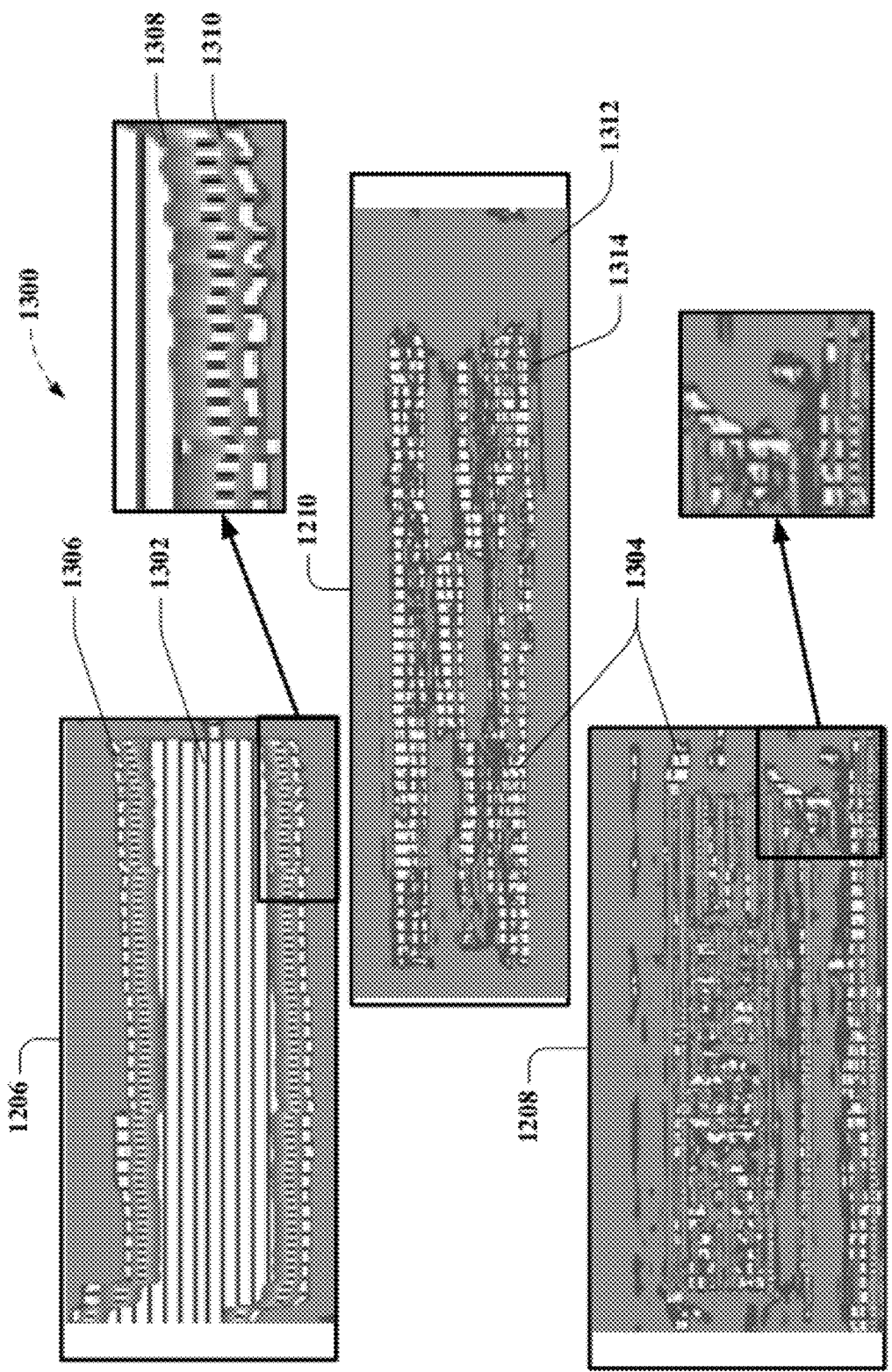

FIGS. 12-15 graphically illustrate concepts of an exemplary structure analysis and regularization 1200, 1300, 1400, and 1500 for modeling to demonstrate further advantages of various aspects of the disclosed subject matter. For example, FIG. 12 depicts a façade segmentation 1202 and a corresponding data cost 1204 of boundary regularization, where regions 1206, 1208, and 1210 are further described with regard to FIG. 13. For example, in FIGS. 12-13, for illustration purposes, the data cost can be color-coded from a high value indicated by red to a low value indicated by blue, whereas green can depict intermediate values. However, due to the limitations imposed by using grayscale images, line shading is used to further illustrate such concepts. For instance, regions 1206, 1208, and 1210 of FIG. 12 are shown zoomed in to further detail data cost variations of the regions in FIG. 13. For example, region 1206 depicts coarse horizontal line shading 1302 to emulate low data cost values for sub-regions, whereas coarse vertical line shading 1304 high end data cost values for sub-regions, and fine vertical line shading 1306 is used to indicate intermediate data cost values.

Further note, that due to the limitations imposed by using grayscale images, the data cost values are typically comprised of a continuum of discrete values between the high end and low end data cost values. For example, regions 1308 and 1310 lie between low and intermediate data cost values 1308 or between high and intermediate data cost values 1310, respectively. However, for illustrative purposes, these regions have not been separately line shaded, as is also the case for the general background regions of higher data cost 1312 and local variations 1314.

Figure 14:
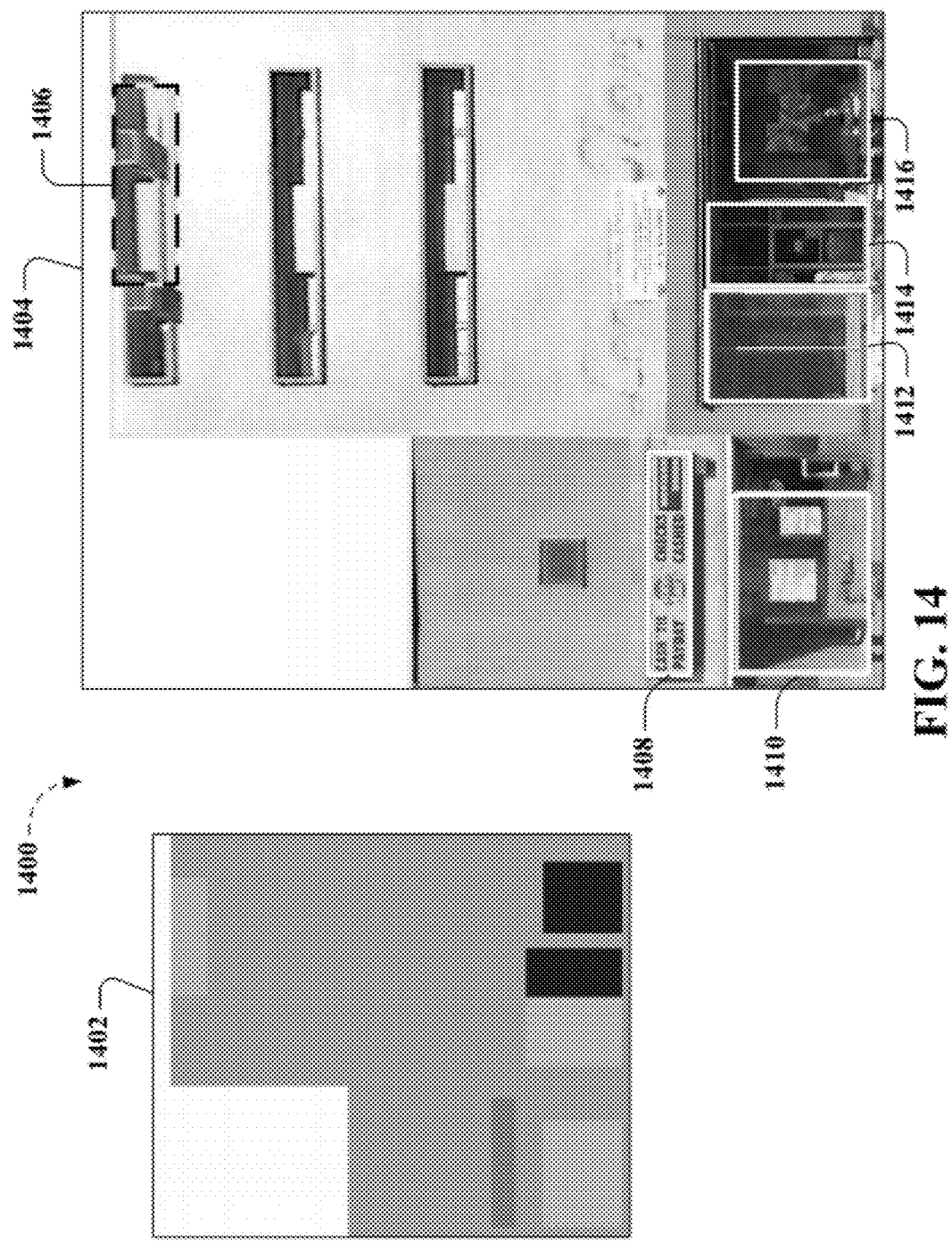
Figure 15:
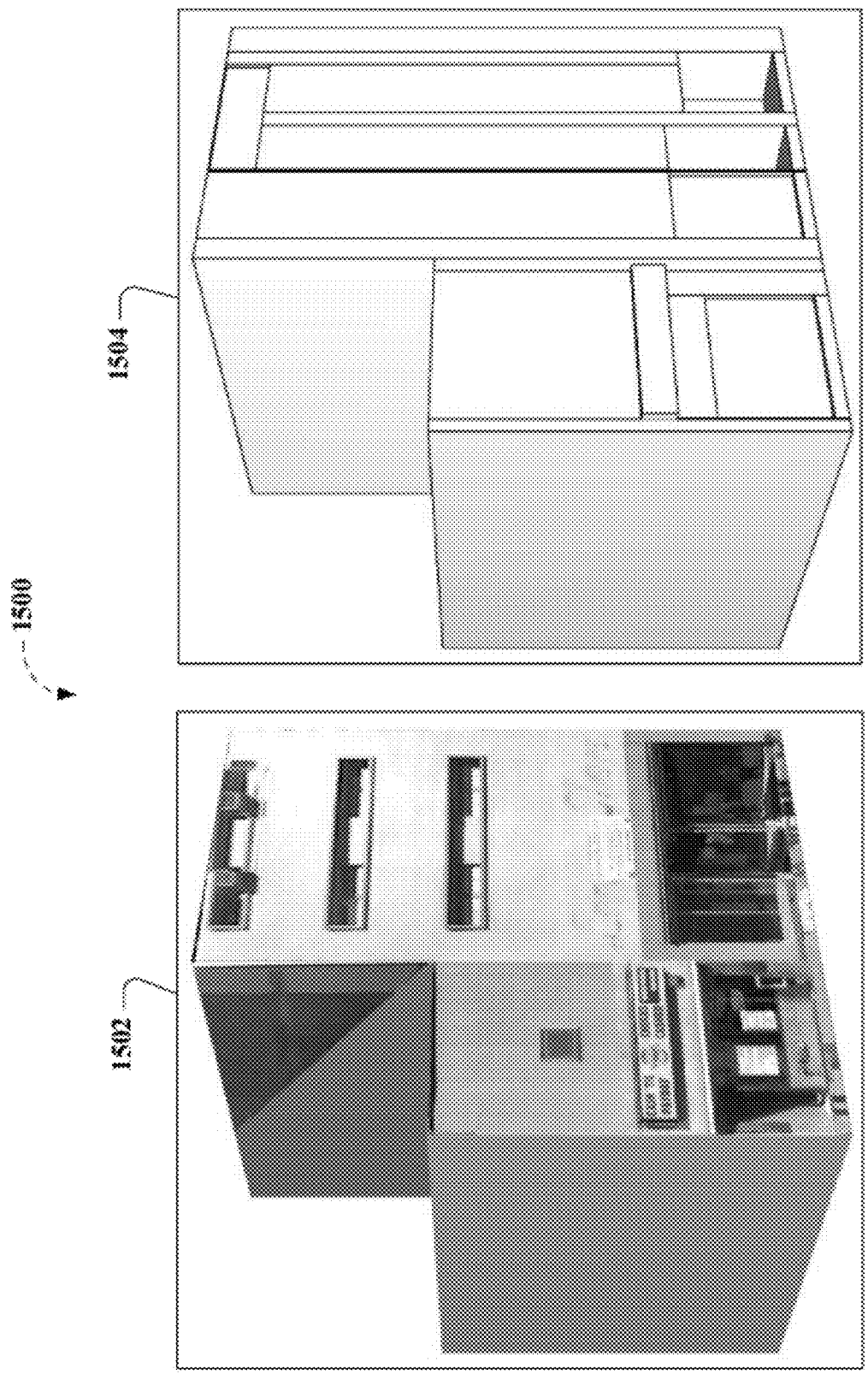

FIG. 14 depicts a regularized depth map 1402 and a texture-mapped façade 1404, with corresponding textured-mapped façade regions 1406, 1408, 1410, 1412, 1414, and 1416. FIG. 15 depicts a texture-mapped block 1502 and corresponding block geometry 1504.

According to further aspects of the disclosed subject matter, a graph-based segmentation framework, similar to that described above regarding FIGS. 5, 9-11, etc. can be employed to jointly segment the orthographic texture and depth maps into regions, where each region can be considered as a distinct element within the façade. Advantageously, shape-based segmentation methods according to the disclosed subject matter can jointly utilize texture and depth information, and can enable the fully automatic façade structure analysis. According to various aspects, such techniques improve upon conventional top-down recursive sub-division techniques, which can be inefficient in producing satisfactory results without user interaction.

For example, according to exemplary embodiments, a graph $\Gamma = \langle \zeta, E \rangle$ can be defined on the orthoimage image O with all pixels as vertices $\zeta$ and edges E connecting neighboring pixels. To encourage horizontal and vertical cut, 4-neighborhood system can be used to construct E. Note that, according to an aspect, a weight function for an edge connecting two pixels with reliable depth estimations can be based both on the color distance and normalized depth difference as in Equation 11.

$$w((v_i, v_j)) = \|c_i - c_j\|^2 \cdot \left(\frac{z_i - z_j}{\zeta(\eta)}\right)^2 \quad \text{(Eqn. 11)}$$

where $\Pi c_i - c_j \Pi^2$ can be defined as the $L_2$-Norm of the RGB color difference of two pixels $v_i$ and $v_j$. According to a further aspect of the disclosed subject matter, the texture image can be pre-filtered (e.g., slightly pre-filtered) using a Gaussian of small variance before computing edge weights. As a further example, weight for an edge connecting two pixels without reliable depth estimations can be set to zero (0) to force them to have the same label, according to various embodiments of the disclosed subject matter. Thus, an edge between a pixel with a reliable depth and a pixel without a reliable depth cannot be constructed, as the weight cannot be defined.

Consequently, according to further aspects of the disclosed subject matter, E can be sorted by non-decreasing edge weight w. For instance, starting with an initial segmentation in which each vertex v, is in its own component, the algorithm can repeat for each edge $e_q=(v_i, v_j)$ in order for the following process: If $v_i$ and $v_j$ are in disjoint components $C_i \neq C_j$, and w ($e_q$) is small compared with the internal difference of both those components, w ($e_q$)=M Int ($C_i$, $C_j$), then the two components can be merged. Thus, minimum internal difference can be defined as in Equation 12.

$$M \text{Int}(C_1, C_2) = \min(\text{Int}(C_1) + \tau(C_1), \text{Int}(C_2) + \tau(C_2)) \quad \text{(Eqn. 12)}$$

where the internal difference of a component C can be defined as the largest weight in the minimum spanning tree of the component as in Equation 13.

$$\text{Int}(C) = \max_{e \in MST(C,E)} w(e) \quad \text{(Eqn. 13)}$$

In addition, the non-negative threshold function $\tau(C)$ can be defined on each component C according to further aspects, where a difference in this threshold function between two components greater than their internal difference can serve as evidence of a boundary between them. According to certain exemplary embodiments favoring a rectangular shape for each region, the threshold function $\tau(C)$ can be defined by the divergence $\vartheta$ (C) between the component C and a rectangle, which can be defined as the portion of the bounding box $B_C$ with respect to the component C, $\vartheta$ (C)=$|B_C|/|C|$. Accordingly, it can be understood that for small components, Int (C) can be shown to be an inadequate estimate of the local characteristics of the data. Therefore, the threshold function can be adaptive based on the component size, as per Equation 14.

$$\tau(C) = \left(\frac{\wr}{|C|}\right)^{\vartheta(C)} \quad \text{(Eqn. 14)}$$

where $\wr$ can be defined as a constant, e.g., a constant set to 3.2 in various exemplary implementations of the disclosed subject matter. It can be understood that $\tau$ can be large for components that do not fit a rectangle, and in an aspect, two components with large $\tau$ can be more likely to be merged. Furthermore, a larger $\wr$ favors larger components, which can require stronger evidence of a boundary for smaller components.

In further exemplary implementations, once the segmentation is accomplished, the depth values for all pixels in $C_i$ of each reliable component $C_i$ can be set to the median, and in a further aspect, the depth of the largest region can be regarded as the depth of the base plane for the façade. Moreover, for an unreliable component $C_i$ smaller than a particular predetermined size, e.g., a predetermined size set to 4% of the current façade area in certain exemplary implementations, the unreliable component can be merged to its only reliable neighboring component if such a neighboring component exists.

Except for the base plane of the façade, various exemplary embodiments can fit a rectangle to each element on the façade. For an element $C=\{v_i=(x_i, y_i)\}$, the median position $(x_{med}, y_{med})$ can be obtained by $x_{med}$=median$_i x_i$ and $y_{med}$=median$_i y_i$. In addition, outlier points can be removed that are $|x_i - x_{med}| > 2.8\ \sigma_x$ or $|y_i - y_{med}| > 2.8\ \sigma_x$, where $\sigma_x = \Sigma_i |x_i - x_{med}|/|C|$ and $\sigma_y = \Sigma_i |y_i - y_{med}|/|C|$. According to further aspects, points that are in the 1% region of the left, right, top and bottom according to their ranking of x and y coordinates in the remaining point set can be removed. In this way, a reliable subset $C_{sub}$ of C can be obtained. Accordingly, the bounding box $B_{C_{sub}}$ of $C_{sub}$ can be defined as the fitting rectangle of C, where the fitting confidence can then be defined as in Equation 15.

$$f_C = \frac{B_{C_{sub}} \cap C}{B_{C_{sub}} \cup C} \quad \text{(Eqn. 15)}$$

Thus in various non-limiting embodiments, the rectangles as distinct façade elements can be retained if the confidence $f_C$ exceeds a predetermined threshold (e.g., $f_C > 0.72$) and the rectangle size is not too small. As a result, rectangular elements can be automatically snapped into the nearest vertical and horizontal mode positions of the accumulated Sobel responses on the composed texture image, if their distances are less than a predetermined criteria, e.g., 2% of the width and height of the current façade according to exemplary non-limiting implementations. Thus, detected rectangles can be nested within each other. When producing the final 3D model, according to a non-limiting aspect, larger elements can be pop up from the base plane, and then smaller elements within the larger element can be filled. If, for example, two rectangles overlap but do not contain each other, we first pop up the one that is closest to the base plane.

In further non-limiting embodiments, boundaries of the façade of a block can be further regularized to favor sharp change and penalize serration. For example, as with shape regularization of structure elements described above, similar techniques can be used to compute the bounding box $[x_{min}, x_{max}] \times [y_{min}, y_{max}]$ of the façade. In addition, the upper boundary of the façade can be further optimized, as there can be some uncertainty whether a building block is indeed a single building with the same height during block partition.

Figure 16:
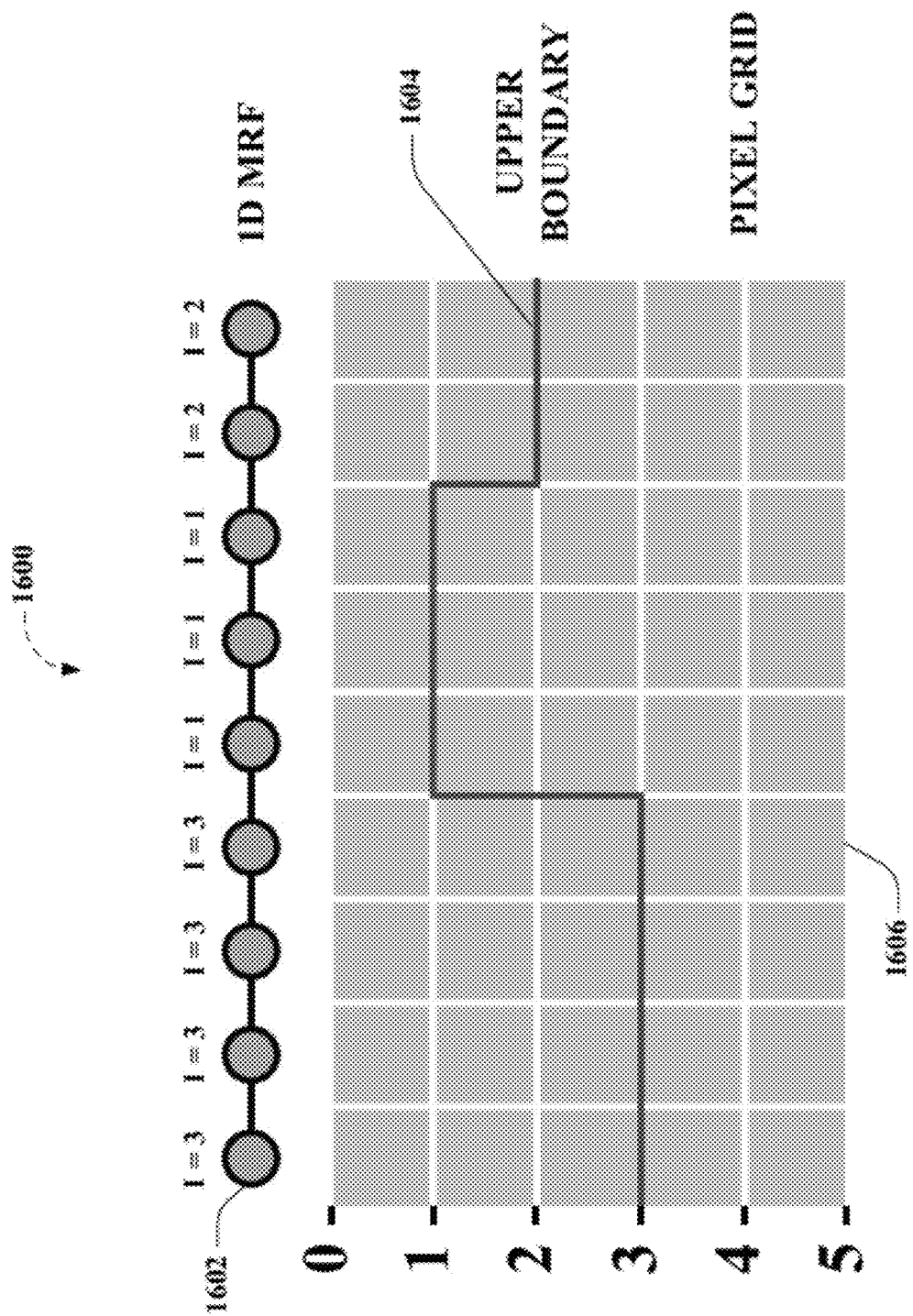
FIG. 16 illustrates a schematic block diagram of exemplary non-limiting Markov Random Field (MRF) graph that can facilitate optimizing a façade upper boundary in accordance with further aspects of the disclosed subject matter.

FIG. 16 illustrates a schematic block diagram 1600 of exemplary non-limiting Markov Random Field graph 1602 that can facilitate optimizing a façade upper boundary 1604 in accordance with further aspects of the disclosed subject matter. For example, in FIG. 16, a one-dimensional (1D) Markov Random Field 1602 is depicted on the horizontal direction of the orthoimage 1606. It is noted that each $x_i \in [x_{min}, x_{max}]$ defines a vertex, and an edge can be added for two neighboring vertices. The label $l_i$ of $x_i$ corresponds to the position of the boundary, and $l_i \in [y_{min}, y_{max}]$ for all $x_i$. Therefore, one label configuration of the MRF corresponds to one façade boundary. Thus, all or substantially all texture, depth, and segmentation information can be used to define the data cost, which can be defined according to the horizontal Sobel responses as in Equation 16.

$$y_i(l_j) = 1 - \frac{HorizontalSobel(i, j)}{2\max_{xy} HorizontalSobel(x, y)} \qquad \text{(Eqn. 16)}$$

Furthermore, if $l_j$ is close to the top boundary $r_i$ of a reliable depth map, $|l_j-r_i|<\beta$, where $\beta$ is an empirically set threshold (e.g., a threshold empirically set to $0.05(y_{max}-y_{min}+1)$), the data cost can be updated by multiplying it with $(|l_j-r_i|+\in)/(\beta+\in)$. Similarly, if $l_j$ is close to the top boundary $s_i$ of segmentation $|l_j-s_i|<\beta$, the data cost can be updated by multiplying it with $(|l_j-s_i|+\in)/(\beta+\in)$.

For the façades whose boundaries are not in the viewing field of any input image, the façade boundary can be snapped to the top boundary of the bounding box, and $\phi_i(y_{min})$ can be updated by multiplying it with empirically determined constant, e.g., an empirically determined constant of 0.8 according to various exemplary implementations. For instance, referring again to FIGS. 12-13, exemplary defined data cost is depicted in 1204, 1206, 1208, 1210.

It can be understood that height of the façade upper boundary usually changes in the regions with strong vertical edge responses. Thus, vertical Sobel responses at each $x_i$ can be accumulated into $V_i = \Sigma_{y \in [y_{min}, y_{max}]} VerSobel(i, y)$, and the smoothness term can be defined as in Equation 17.

$$y_{i,i+1}(l_i, l_{i+1}) = \mu|l_i - l_{i+1}|\left(1 - \frac{V_i + V_{i+1}}{2\max_j V_j}\right) \qquad \text{(Eqn. 17)}$$

where $\mu$ is a controllable parameter. As a result, in various non-limiting embodiments of the disclosed subject matter, the boundary can optimized by minimizing a Gibbs energy as in Equation 18.

$$E(L) = \sum_{x_i \in [x_{min}, x_{max}]} y_i(l_i) + \sum_{x_i \in [x_{min}, x_{max}-1]} y_{i,i+1}(l_i, l_{i+1}) \qquad \text{(Eqn. 18)}$$

where $\phi_i$ can be defined as the data cost, and $\phi_{i,\ i+1}$ can be defined as the smoothing cost. According to further aspects of the disclosed subject matter, an exact inference can be obtained with a global optimum by various conventional techniques, e.g., such as a belief propagation.

Exemplary Image-Based Modeling Methodologies

Various embodiments of the disclosed subject matter provide methodologies for image-based modeling. In addition to methodologies 200 and 300 as described above regarding FIGS. 2-3, FIG. 17 depicts a flowchart demonstrating various aspects of exemplary non-limiting methodologies 1700 that facilitate image-based modeling.

For instance, exemplary image-based modeling methodologies 1700 can comprise performing a multi-view semantic segmentation on a subset of reconstructed input image data representing a façade to recognize façade structure and segment the façade at 1702. For instance, as described above, a sequence of captured images (e.g., street-side captured images of a building or city façade), can be registered and reconstructed according to a structure from motion algorithm to compute 3d points, lines, and camera positions. Thus, a multi-view semantic segmentation can be performed on input images 502 to construct over-segmented patches 504, by using point matching information from SFM between multiple views to impose segmentation consistency, and to produce the façade segmentation 604, by building a graph for each image and merging graphs by adding edges as described above, for example, in reference to FIG. 7.

According to further embodiments of image-based modeling methodologies 1700, at 1704 the subset of the reconstructed input image data can be block partitioned to produce an object block (e.g., a building block) associated with the segmented façade (e.g., 604). For example, according to various embodiments, a block partition scheme can use vertical lines (e.g., such as vertical liens 408) to produce individual building façade blocks (e.g., 802, 804, 806, 808, 810, 812, and 814, etc) as depicted and described above with reference to FIG. 8.

In addition, methodologies 1700 for image-based modeling can further include performing an inverse orthographic composition at 1708 on the subset of the reconstructed input image data associated with the object block to produce a composed orthographic depth map (e.g., 904) and a composed orthographic texture (e.g., 1002) for the object block. For instance, inverse orthographic composition as described herein can be performed on partial orthographic depth maps 904 and textures 1002 from the sequence of images and can produce composed orthographic depth map 1004 and composed orthographic texture 1102.

At 1710, further embodiments of image-based modeling methodologies 1700 can include, performing structural analysis and regularization of the composed orthographic depth map 904 and the composed orthographic texture 1002 to identify structural elements at a plurality of facade depths for the object block. For instance, as more fully described above, joint semantic segmentation of orthographic depth map and orthographic texture can be performed as well as, shape and boundary regularization from the facade segmentation 1202 to produce the regularized depth map 1402 and texture mapped façade 1404.

Moreover, at 1712, an object model (e.g., a 3D building model 1502) can be generated by generating geometry 1504 for the at least one object block from the identified structural elements at the plurality of façade depths and texturing the object block.

In view of the methodologies described supra, systems and devices that can be implemented in accordance with the disclosed subject matter will be better appreciated with reference to the functional block diagrams of FIGS. 18-22. While, for purposes of simplicity of explanation, the functional block diagrams are shown and described as various assemblages of functional component blocks, it is to be understood and appreciated that such illustrations or corresponding descriptions are not limited by such functional block diagrams, as some implementations may occur in different configurations Moreover, not all illustrated blocks may be required to implement the systems and devices described hereinafter.

Exemplary Image-Based Modeling Systems

FIGS. 18-22 depict exemplary non-limiting functional block diagrams for implementing image-based modeling systems and devices in accordance with various aspects of the disclosed subject matter. It is to be appreciated that, according to the various methodologies described herein (e.g., regarding the various figures and related descriptions), the various components and/or subcomponents can be implemented as computer executed components as further described below regarding FIGS. 29-30. For example, according to various implementations, components described herein can be configured to perform applicable methodologies, or portions thereof, disclosed herein by standard software programming techniques and executing the configured components on a computer processor.

Figure 18:
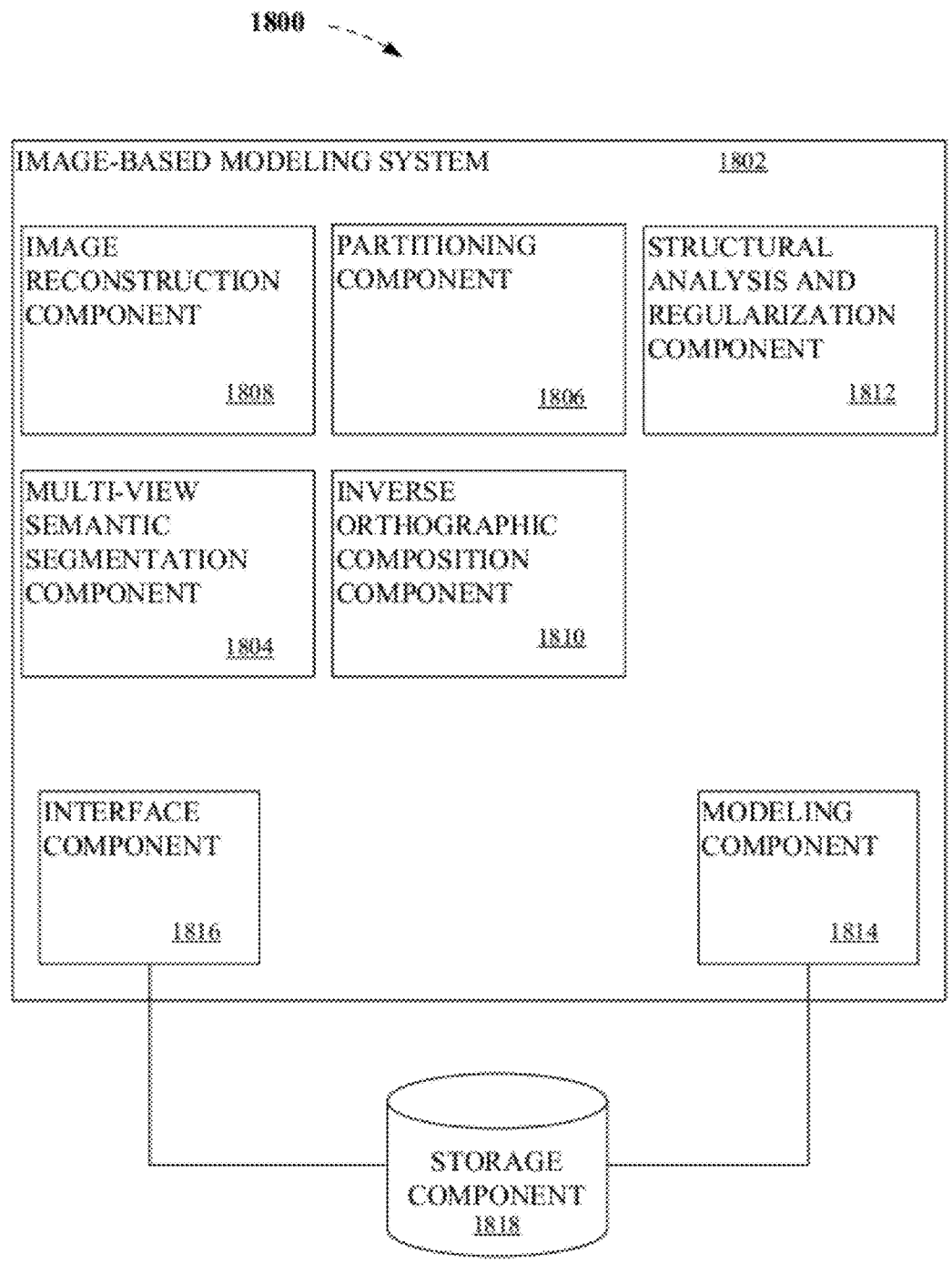
FIGS. 18-22 depict exemplary non-limiting functional block diagrams for implementing image-based modeling systems and devices in accordance with various aspects of the disclosed subject matter.

To that end, FIG. 18 depicts an exemplary non-limiting functional block diagram 1800 including exemplary non-limiting image-based modeling systems 1802, which can comprise can comprise a multi-view semantic segmentation component 1804, for example, that can facilitate methodologies described supra, regarding FIGS. 2, 3, 5-7, 17, etc. In various non-limiting implementations, image-based modeling systems 1802 can include partitioning component 1806 and an image reconstruction component 1808, for example, that can facilitate methodologies described supra, regarding FIGS. 2, 3, 4, 8, 17, etc. In an aspect, image-based modeling systems 1802 can further include inverse orthographic composition component 1810, for example, that can facilitate methodologies described supra, regarding FIGS. 2, 3, 9-11, 17, etc.

In further non limiting embodiments of image-based modeling systems 1802, the systems can include structural analysis and regularization component 1812, for example, that can facilitate methodologies described supra, regarding FIGS. 2, 3, 12-17, etc. In a further aspect, exemplary image-based modeling systems 1802 can further include a modeling component 1814 that can, among other things, store, modify, generate, send and/or receive models, geometry models, generate textured façades, create 3D object models such as building models, create 3D city models, etc., for example, as described supra, regarding FIGS. 2, 3, 14, 15, 17, etc. In yet another aspect, image-based modeling systems 1802 can include an interface component 1816, that can, among other things, receive instructions for interactive segmentation, interactive partitioning, interactive assignment of depth to depth maps, interactive image editing during texture compositing to remove artifacts, receive or store data (e.g., textures, 3D points, cameras positions, sequences of images, depth maps, etc.) to storage component 1818.

Figure 19:
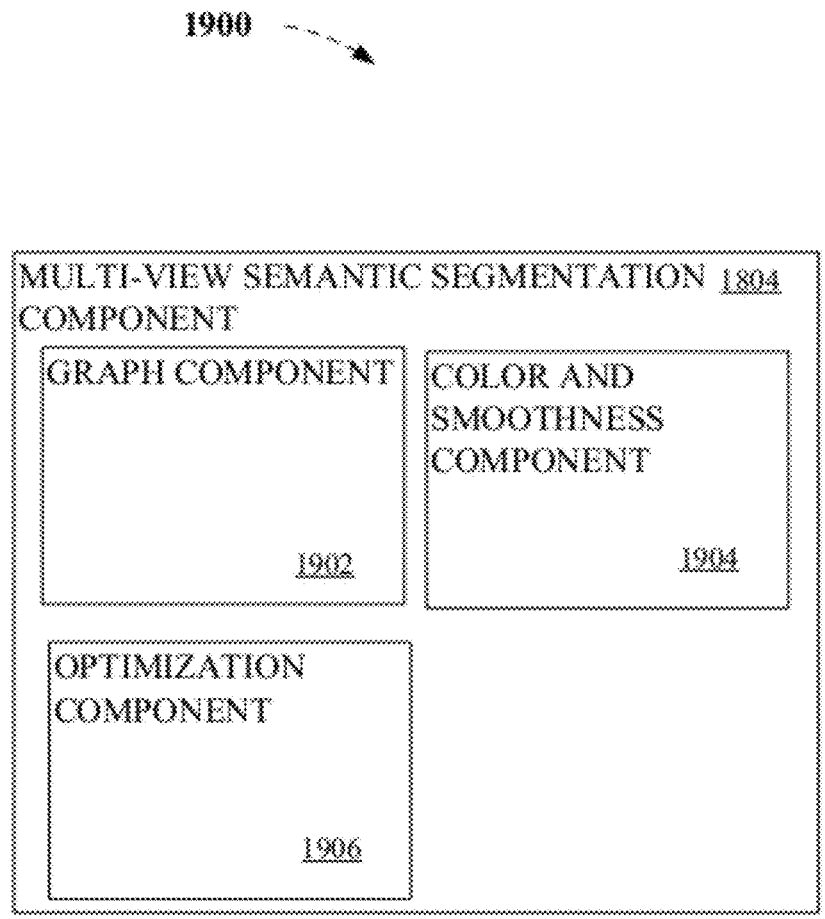

FIG. 19 depicts exemplary non-limiting functional block diagram 1900 of a multi-view semantic segmentation component 1804. As described above, a multi-view semantic segmentation component 1804 can, for example, facilitate methodologies described supra, regarding FIGS. 2, 3, 5-7, 17, etc. Thus, an exemplary multi-view semantic segmentation component 1804 can comprise one or more of a graph component 1902, a color and smoothness component 1904, and an optimization component 1906, or sub-portions thereof. It should be understood that the various component parts of an exemplary multi-view semantic segmentation component 1504 can be configured accordingly to perform the respective methodologies, or portions thereof, describe herein.

Figure 20:
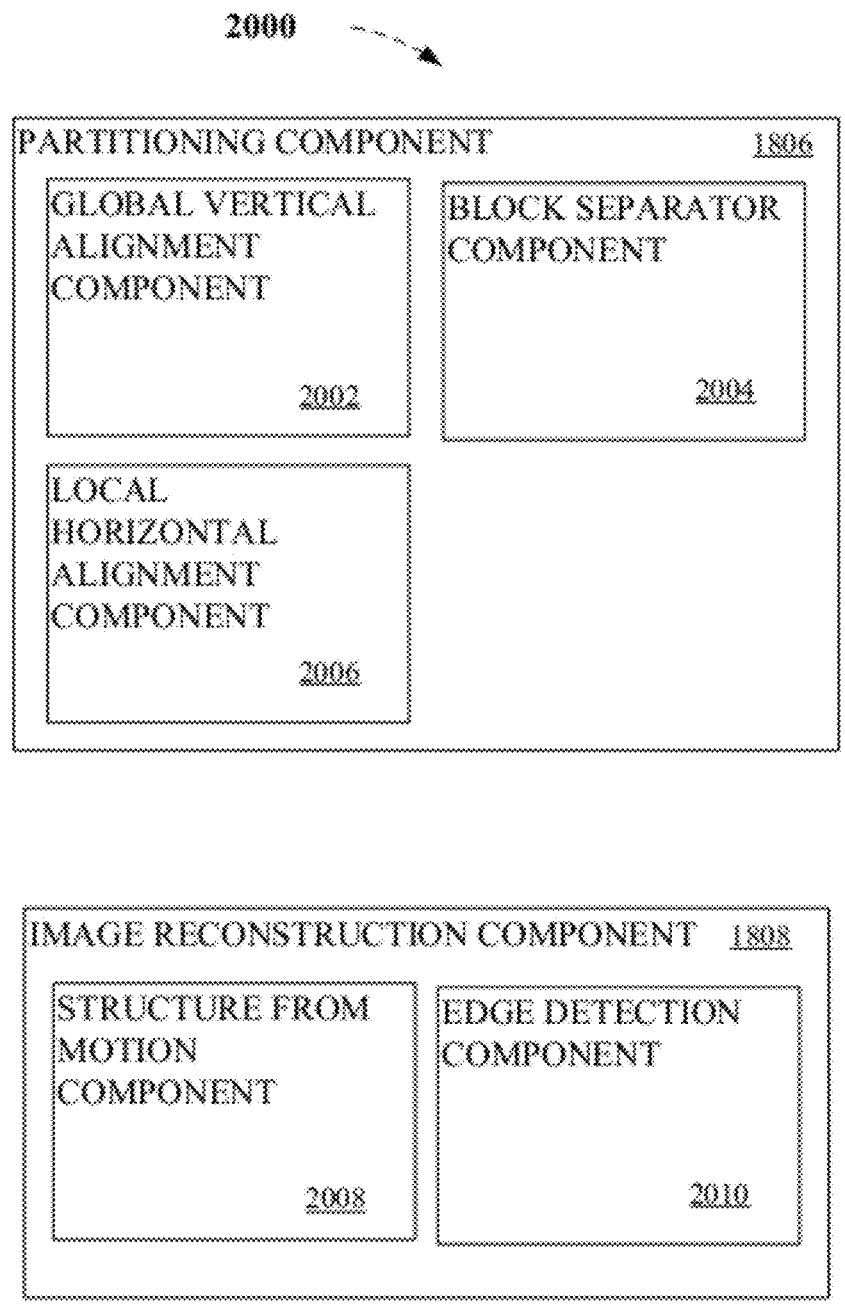

Regarding FIG. 20, exemplary non-limiting functional block diagrams 2000 of a partitioning component 1806 and an image reconstruction component 1808 are depicted. As discussed, exemplary non-limiting façade decomposition component 1506 can, for example, facilitate methodologies described supra, regarding FIGS. 2, 3, 4, 8, 17, etc. Accordingly, an partitioning component 1806 can comprise one or more of a global vertical alignment component 2002, a block separator component 2004, and a local horizontal alignment component 2006, or sub-portions thereof, whereas image reconstruction component 1808 can comprise one or more of a structure from motion component 2008 and an edge detection component 2010, or sub-portions thereof. It should be understood that the various component parts of exemplary partitioning component 1806 and image reconstruction component 1808 can be configured accordingly to perform the respective methodologies, or portions thereof, describe herein.

Figure 21:
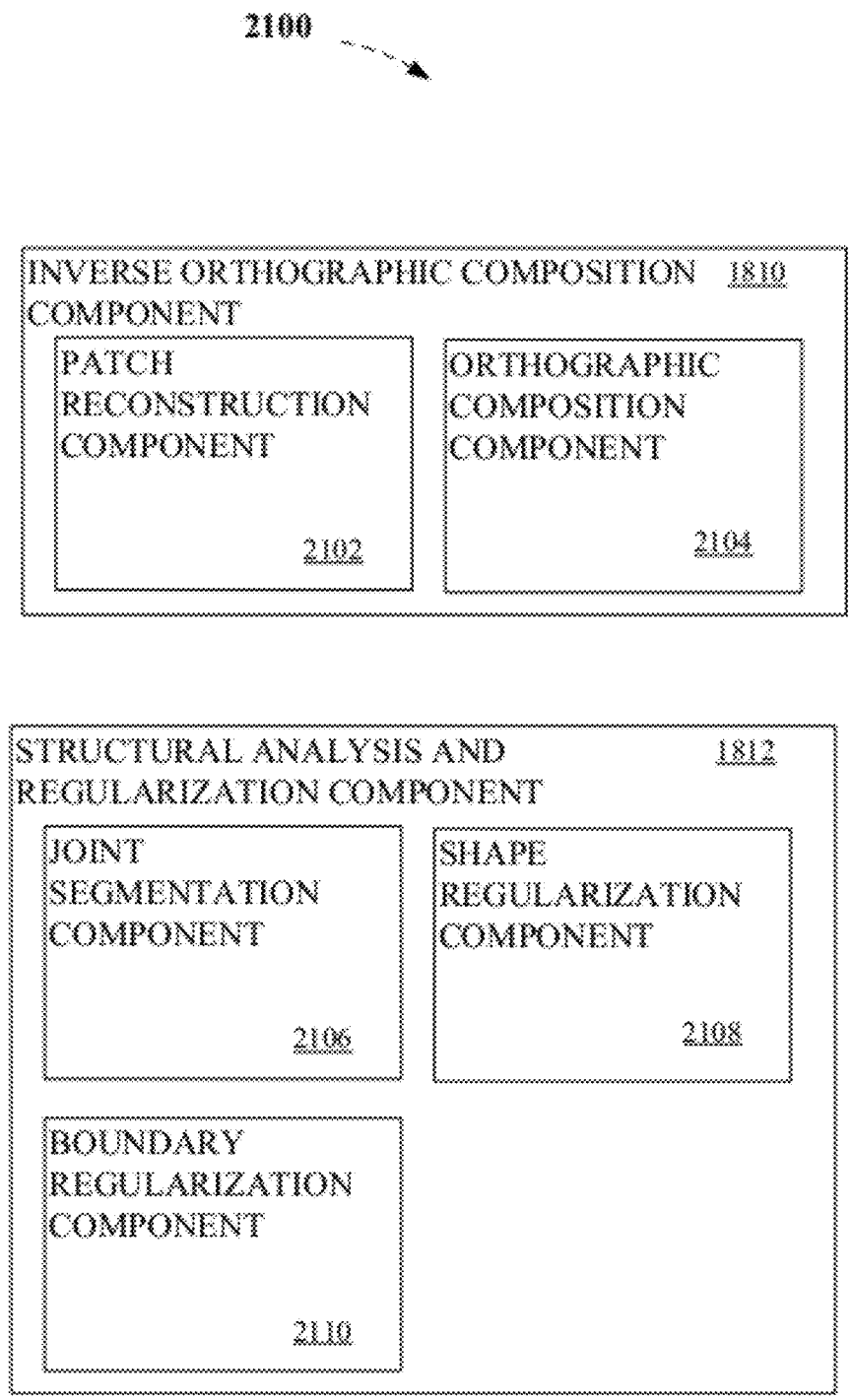

In addition, FIG. 21 depicts exemplary non-limiting functional block diagrams 2100 of an inverse orthographic composition component 1810 and a structural analysis and regularization component 1812. As discussed, exemplary non-limiting inverse orthographic composition component 1810 can, for example, facilitate methodologies described supra, regarding FIGS. 2, 3, 9-11, 17, etc. As further described above, exemplary non-limiting structural analysis and regularization component 1812 can, for example, facilitate methodologies described supra, regarding FIGS. 2, 3, 12-14, 16, 17, etc. Accordingly, an inverse orthographic composition component 1810 can comprise one or more of a patch reconstruction component 2102 and an orthographic composition component 2104, or sub-portions thereof. Moreover structural analysis and regularization component 1812 can comprise one or more of a joint segmentation component 2106, a shape regularization component 2108, and a boundary regularization component 2110, or sub-portions thereof. It should be understood that the various component parts of exemplary inverse orthographic composition component 1810 and structural analysis and regularization component 1812 can be configured accordingly to perform the respective methodologies, or portions thereof, describe herein.

Figure 22:
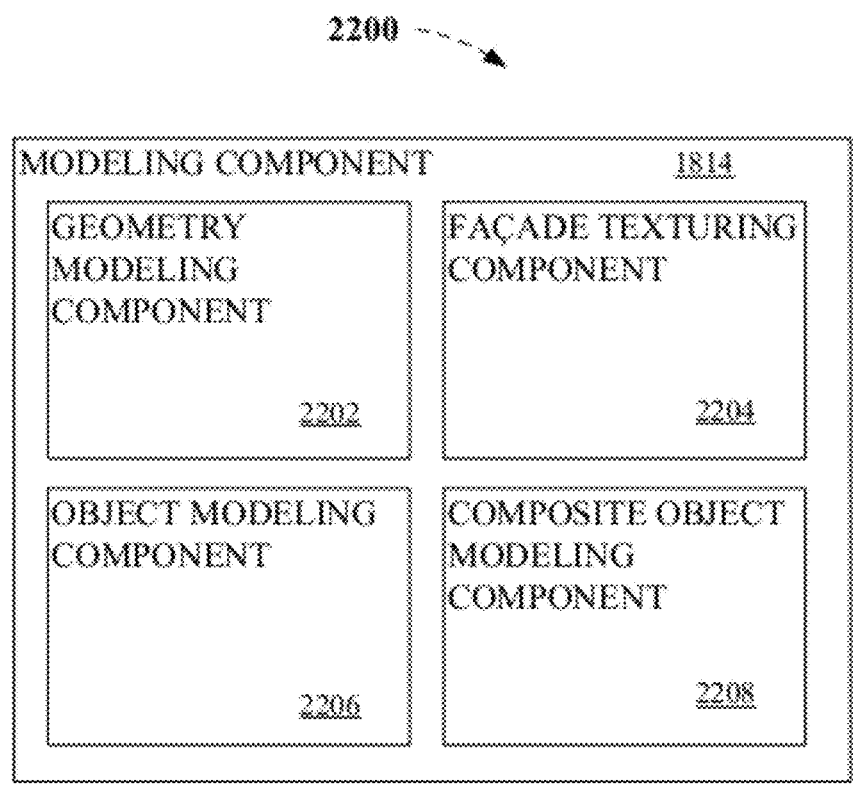
Figure 23:
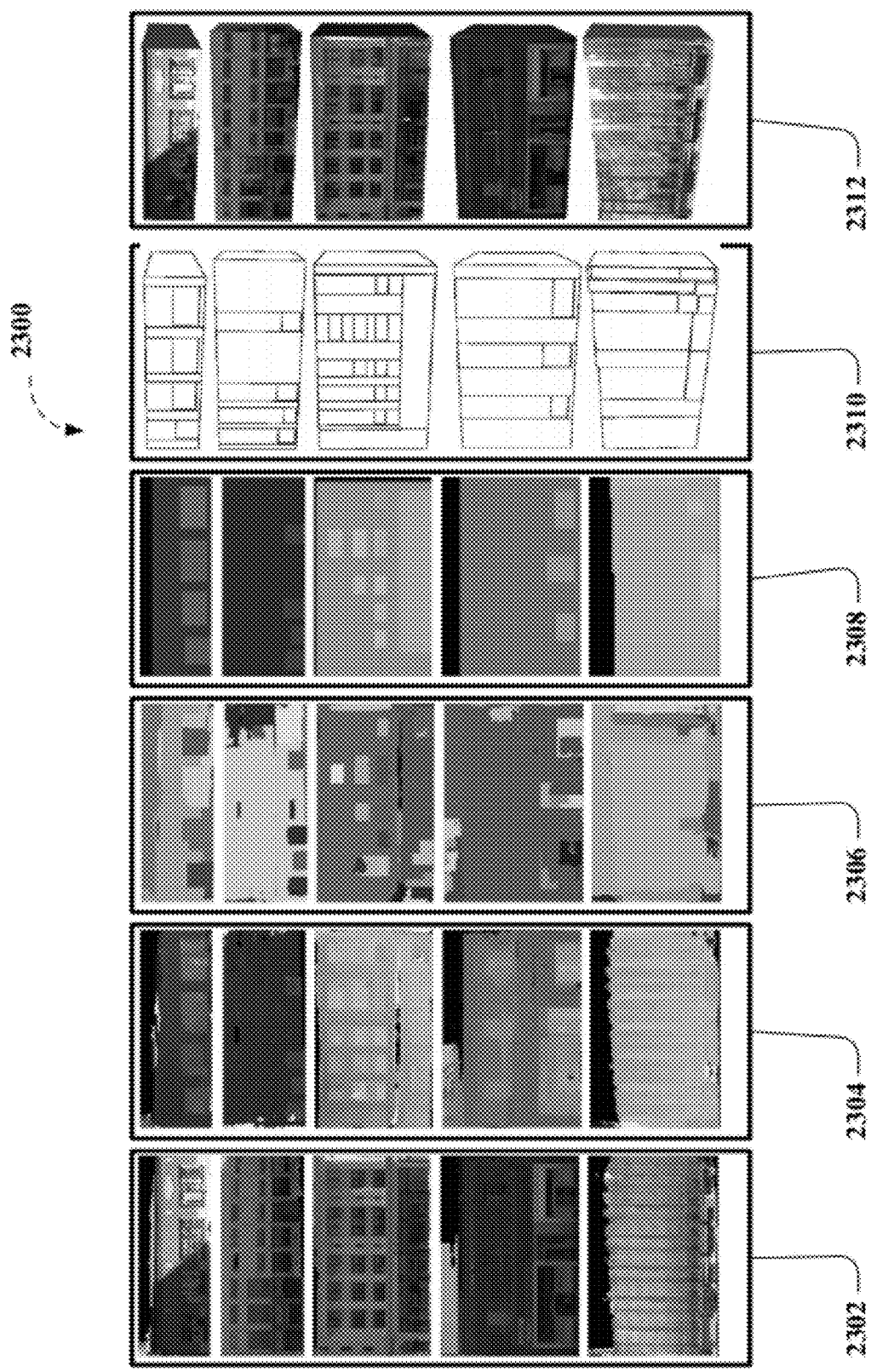
FIGS. 23-28 depict non-limiting modeling examples for various blocks, according to various aspects of the disclosed subject matter.
Figure 24:
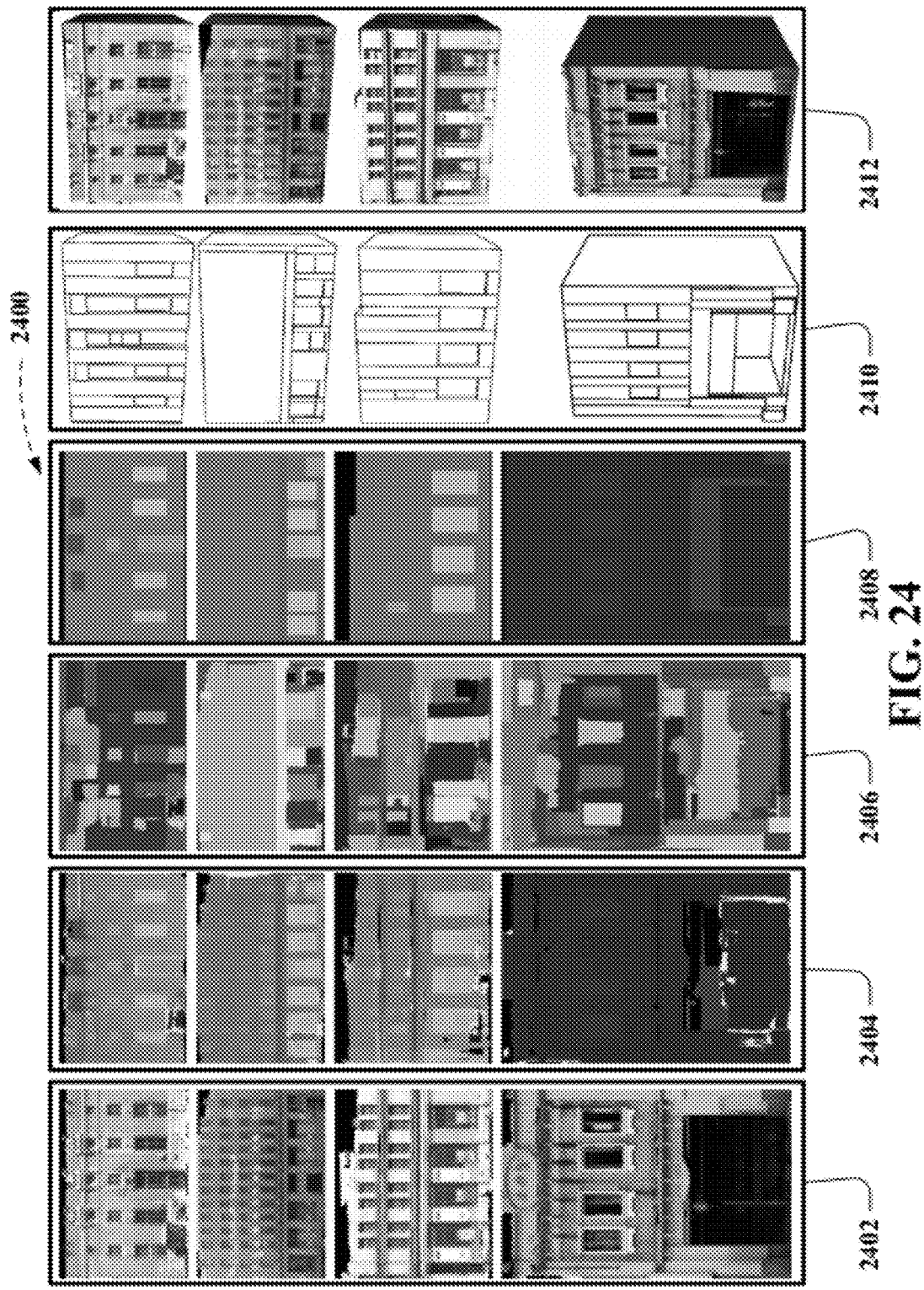
Figure 25:
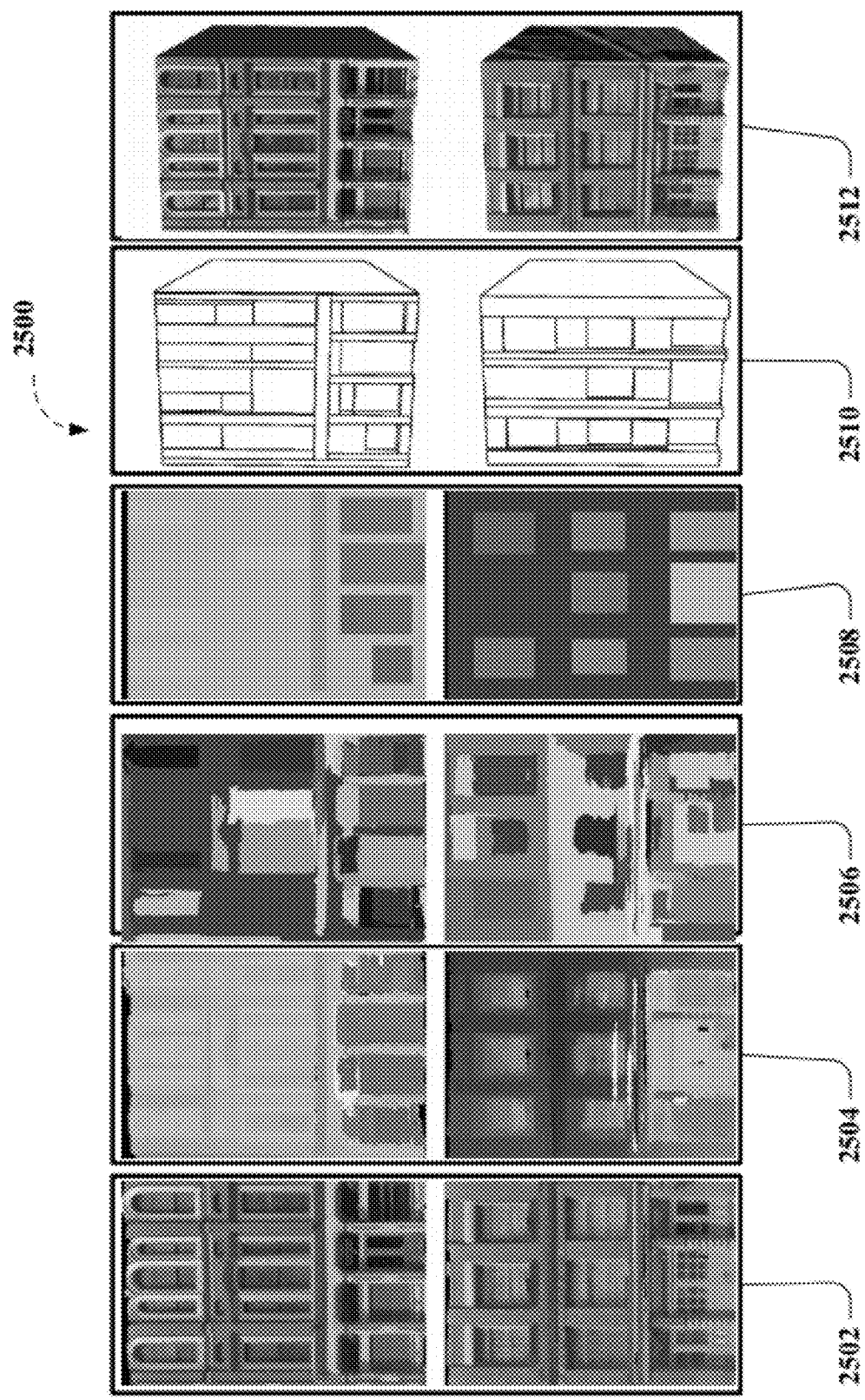
Figure 26:
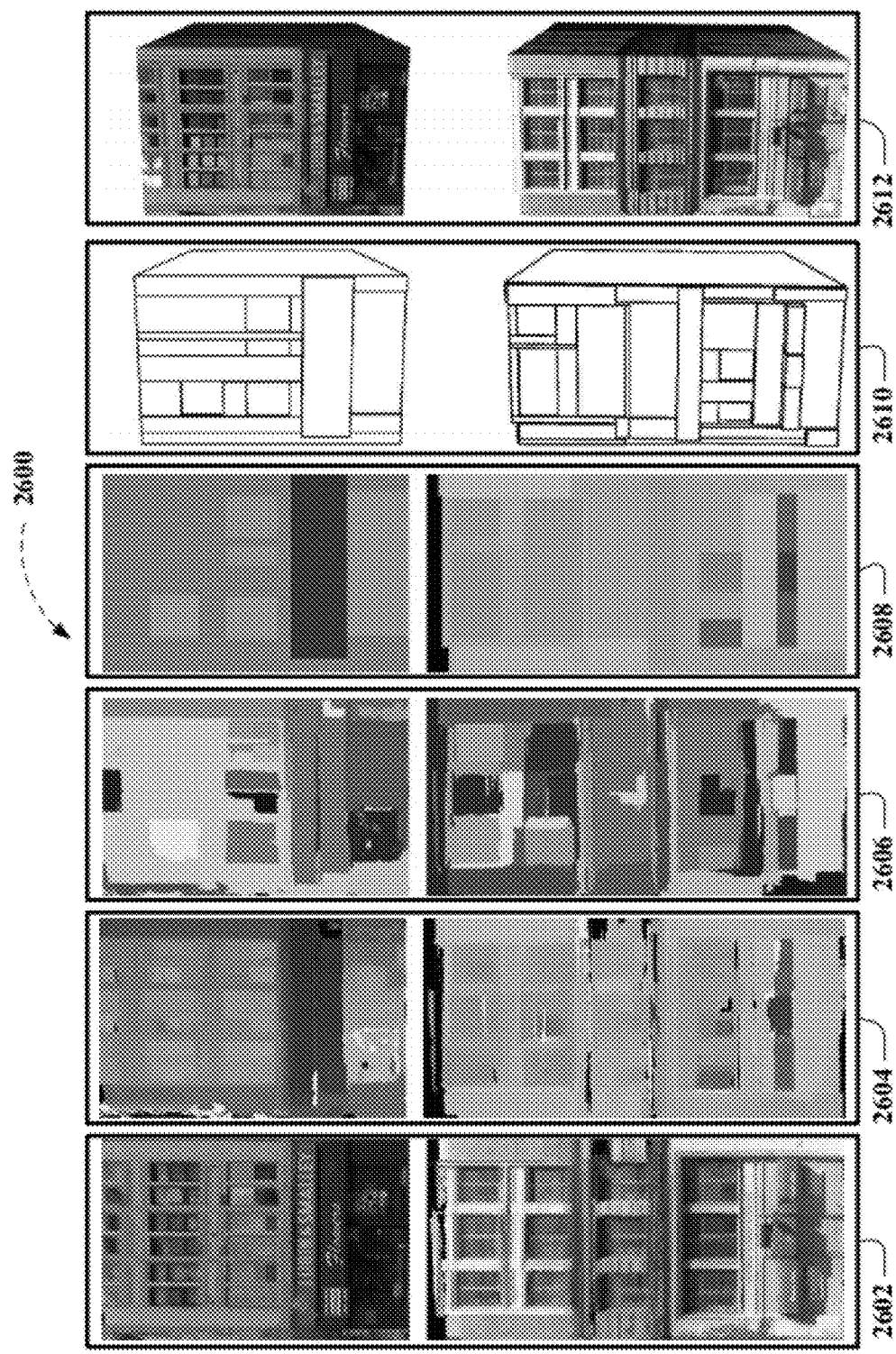
Figure 27:
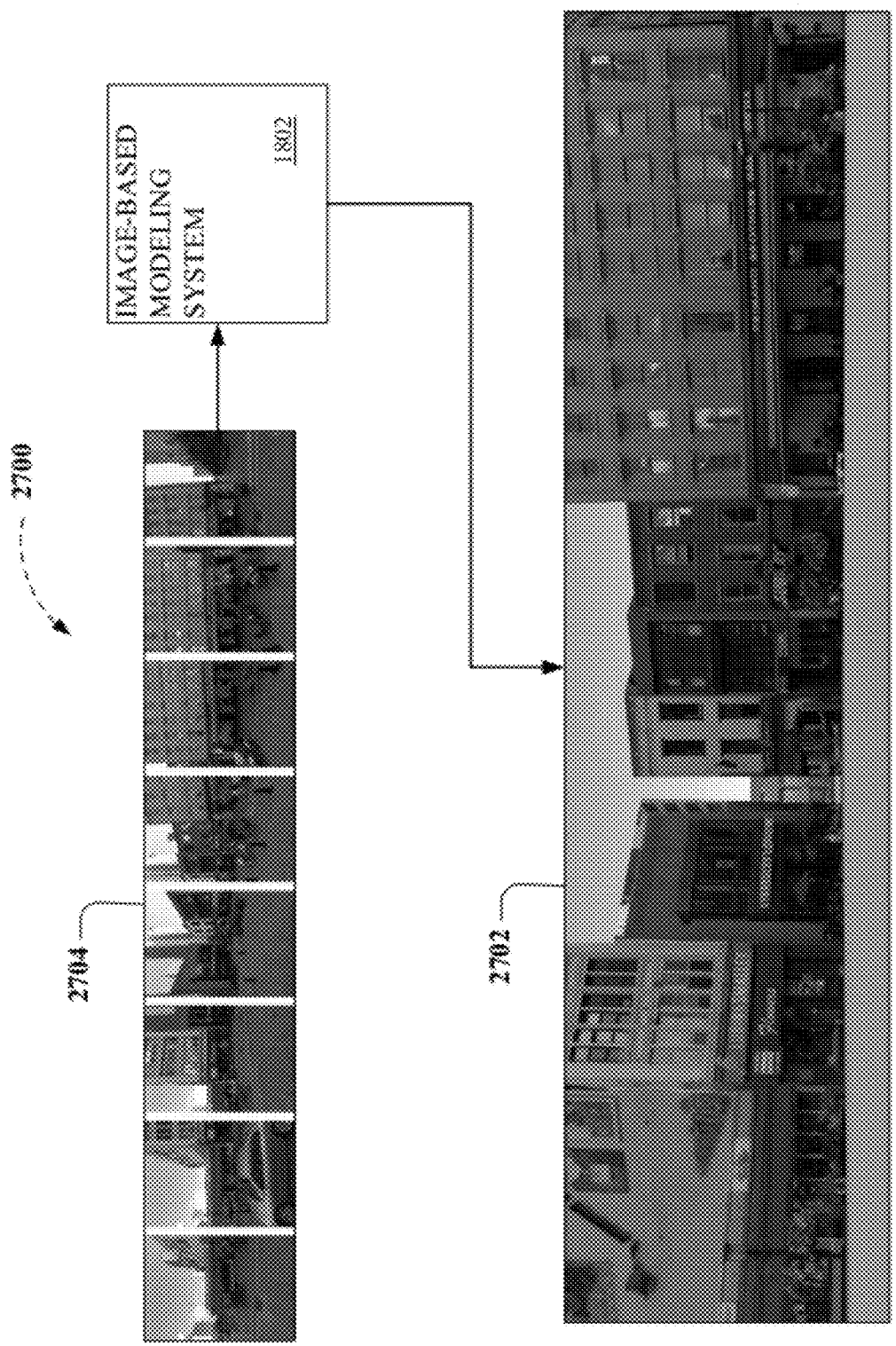

FIG. 22 depicts an exemplary non-limiting function block diagram 2200 of a modeling component 1814. As described above, modeling component 1814 can, among other things, create store, modify, generate, send and/or receive models, geometry models, generate textured façades, create 3D object models such as building models, create 3D city models, etc., for example, as described supra, regarding FIGS. 2, 3, 14, 15, 17, etc. Consequently, an exemplary non-limiting implementation of a modeling component 1814 can comprise one or more of a geometry modeling component 2202 (e.g., for generating a façade geometry), façade texturing component 2204 (e.g., for generating a textured façade), object modeling component 2206 (e.g., for creating a textured object), and a composite object modeling component 2208 (e.g., for composing a composite model, merging textured objects, etc.), or sub-portions thereof. It should be appreciated that the various component parts of an exemplary modeling component 1814 can be configured according to perform the respective methodologies, or portions thereof, describe herein.

To that end, an exemplary non-limiting image-based modeling system 1802 can comprise a multi-view semantic segmentation component 1804 that can produce a semantic segmentation 604 of a façade (e.g., an object such as a building, street-side façade, cityscape, etc.) based on a registered sequence of images associated with the façade. In addition, various embodiments of an image-based modeling system 1802 can further comprise, a partitioning component 1806 that can block partition reconstructed image data to determine an object block (e.g., a building block) associated with the semantic segmentation 604 of the façade.

For instance, an image reconstruction component 1808 can register a sequence of images representing the façade to produce the registered sequence of images. Image reconstruction component 1808 can further computes reconstructed image data comprising, for example, three-dimensional (3D) points, lines, and camera positions associated with the façade. In addition, various non-limiting image-based modeling systems 1802 can include an inverse orthographic composition component 1810 that can compose an orthographic depth map 1004 and texture 1102 from the reconstructed image data for the object block. As a further example, exemplary non-limiting image-based modeling systems 1802 can include a structural analysis and regularization component 1812 that can determine structural elements at various façade depths from the orthographic depth map 1004 and texture 1102 for the object block.

In addition, image-based modeling systems 1802 can further include a modeling component 1814 that can generate block geometry for the object block from the determined structural elements at various façade depths. As further example, modeling component 1814 can be configured to texture the object block to create an object block model associated with the façade. Moreover, modeling component 1814 can be further configured to merge the object block model associated with the façade with another object block model associated with the façade to compose a composite façade model.

Exemplary Image-Based Modeling Results

FIGS. 23-28 depict non-limiting modeling examples 2300, 2400, 2500, 2600, 2700, and 2800, for various blocks, according to aspects of the disclosed subject matter. For instance, in 2302, 2402, 2502, and 2602, orthographic textures are depicted for the various blocks. In 2304, 2404, 2504, and 2604 orthographic color-coded depth map (where unreliable pixels would be shown in yellow as described regarding FIG. 10 at 1006, but for the use of grayscale figures). In addition, in 2306, 2406, 2506, and 2606, façade segmentation is illustrated for the various blocks, whereas the associated regularized depth map is depicted in 2308, 2408, 2508, and 2608. In 2310, 2410, 2510, and 2610, the resulting geometry for the various blocks is illustrated, whereas the resulting textured model is depicted in 2312, 2412, 2512, and 2612.

Exemplary methodologies of disclosed subject matter have been implemented and tested on street-side images of downtown Pittsburgh. These images have been used in Google™ Street View to create seamless panoramic views from images having image resolution is 640×905. For example some of these images are depicted in FIG. 1. According to various aspects of the disclosed subject matter, sequences can be reconstructed using a structure from motion algorithm to produce a set of semi-dense points and camera poses. In addition, cameras can be geo-registered back to a GPS coordinate frame, and all sequences of a scene have been merged with the overlapping camera poses.

Furthermore, according to an aspect, and as further described below regarding FIGS. 29-30, various methodologies as described herein have been implemented with unoptimized C++ code, with parameters tuned manually on a set of 5 façades. In addition, each frontal façade can be extended in the z-direction into a box with a default depth (e.g., a default depth set to 18 meters). Thus, texture mapping can be done by visibility checking using z-buffer ordering.

Additionally, side faces of the box can also be automatically textured if the boxes are not blocked by neighboring buildings. For instance, for a portion of Pittsburgh, 10498 images were used, and 202 building blocks were reconstructed. On a small cluster composed of normal desktop Personal Computers (PCs), exemplary results can be produced automatically in hours, for example, including approximately 2 hours for SFM, 19 hours for segmentation, and 2 hours for partition and modeling of the exemplary modeling result described herein.

Referring again to FIGS. 23-26, the figures depict different examples of blocks and intermediate results. In addition, regarding FIGS. 27-28, close-up views 2702 and 2802 of exemplary final models are depicted, which have been produced by exemplary image-based modeling system 1802 from input image sequences 2704 and 2804, respectively. With the exception of certain described modification done to present concepts using grayscale figures, the exemplary results described herein were produced automatically without manual touch-up.

In a further aspect, for rendering final models, each building block can be represented in multiple levels of detail, e.g., two levels of detail in exemplary non-limiting embodiments. For instance, one level can comprise a façade base plane, whereas another level can comprise corresponding augmented elements of the façade.

In yet another aspect of exemplary image-based modeling results, for semantic segmentation, 173 images have been hand-labeled by uniformly sampling images from the data set to create the initial database of labeled street-side images. In addition, each sequence can be recognized and segmented independently. However, in testing, labeled images are not used if they come from the same image sequence in order to fairly demonstrate real performance on unseen sequences.

It can be seen from the exemplary image-based modeling results, that various embodiments of the disclosed subject matter are remarkably robust as minor errors or failure cases do not create visually disturbing artifacts. For instance, while distinct elements such as windows and doors within the façade may not always be reconstructed due to lack of reliable 3D points, exemplary implementations of the disclosed subject matter can smooth such elements to the façade base plane with satisfactory textures as the depth variation is small.

In addition, it can be seen that most artifacts arise from the texture itself. For instance, while many trees and people may not be removed from textures on the first floor of the buildings as can be seen in close-up views 2702 and 2802 of FIGS. 27-28, it can be appreciated that such artifacts could be easily corrected. For example, further non-limiting embodiments of the disclosed subject matter can remove various artifacts, e.g., via interactive segmentation and/or inpainting, based at least in part on instructions received by an interface component as described above. Furthermore, some artifacts can arise on façade boundaries if background buildings are not adequately separated from foreground buildings, as can be seen in the middle of close-up view 2702 of FIG. 27.

As described above, further exemplary image-based modeling results are depicted in FIGS. 23-26. For example, various exemplary implementations have been tested on different input data with higher resolution images, such as the representative example generated using a Guangzhou data set indicated in the bottom panel of 2402.

According to further non-limiting embodiments, moderating the use of rectangular shape assumptions and/or trade-offs for robustness can enable more demanding modeling tasks such as for automatic or semi-automatic modeling of landmark buildings. However, it can be understood that the rectangular element assumptions can always be considered as a first level approximation. Accordingly, in further non-limiting implementations, such rectangular element assumptions could be replaced by other objects or the resulting models or intermediate results can be refined by other techniques.

It can be further understood that with a limited viewing field of a single camera, upper parts of tall buildings can in certain circumstances be missed. Accordingly, in further non-limiting implementations, street-side modeling of the lower parts of the buildings in accordance with the disclosed matter can be merged with modeling results from aerial images for the upper parts using conventional techniques. Alternatively, exemplary implementations could employ multiple cameras with one camera pointing upward to capture upper parts of buildings. Thus, it should be understood that while, in certain circumstances, the disclosed embodiments can be augmented with other conventional techniques to address these and other unique situations, such alterations are intended to be encompassed within the scope of the disclosed subject matter.

In addition, while the various embodiments describe herein provide exemplary automatic image-based modeling, further non-limiting embodiments can employ interactive editing techniques to further improve final modeling results, for example, by employing interactive editing techniques in 2D image space. As a further example, in other exemplary implementations, segmentation results can be retouched in the images space with conventional interactive image segmentation solutions. In addition, according to a further aspect, a block partition can be manually indicated in any of the images to generate a vertical separator. Moreover, in further non-limiting aspects, façade elements can be added, deleted, and so on in the orthographic texture and depth image, similar to the operations in Google™ Sketchup and the like. Other exemplary implementations can include incorporation of 3D information in the semantic segmentation, as well as the usage of grammar rules extracted from reconstructed models to synthesize missing parts procedurally.

Thus, as described herein, the disclosed subject matter provides various automatic or semi-automatic image-based modeling systems and methodologies that can produce photo-realistic 3D models from a sequence of overlapping images (e.g., a sequence of overlapping images captured along a street). In various non-limiting embodiments, a multiple view semantic segmentation can identify object classes of interest. In further non-limiting embodiments, the disclosed subject matter can employ a systematic partition of buildings into independent blocks using man-made vertical and horizontal lines. Moreover, exemplary embodiments of the disclosed subject matter can provides robust façade modeling with pushed and pulled rectangular shapes. In various aspects, exemplary components can be assembled into a robust and fully automatic system or allow for conventional interactive editing and refinement techniques.

Exemplary Networked and Distributed Environments

One of ordinary skill in the art can appreciate that the various embodiments of image-based modeling described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may utilize image-based modeling as described for various embodiments of the subject disclosure.

Figure 29:
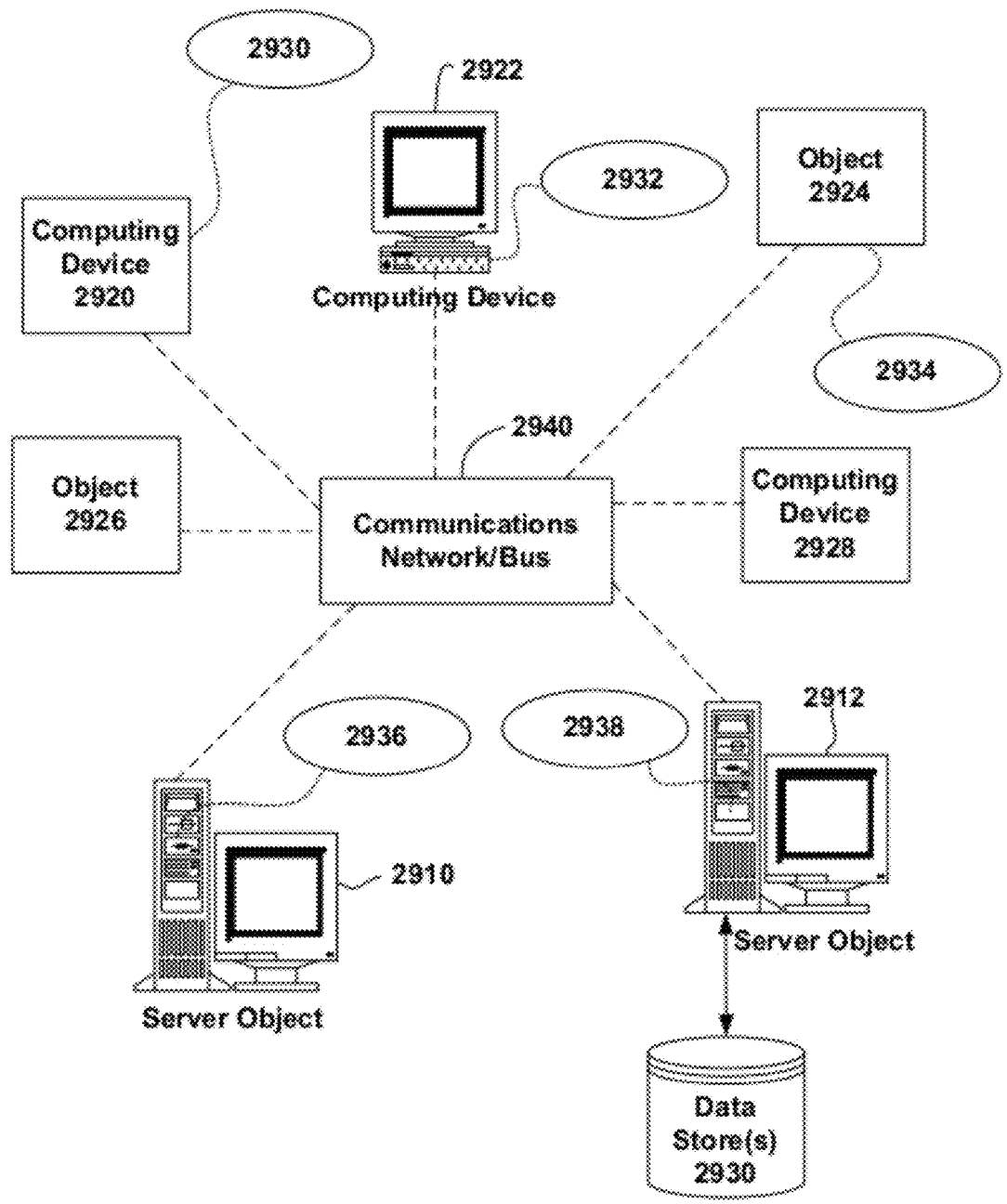
FIG. 29 is a block diagram representing exemplary non-limiting networked environments in which various embodiments described herein can be implemented.

FIG. 29 provides a schematic diagram of an exemplary networked or distributed computing environment. The distributed computing environment comprises computing objects 2910, 2912, etc. and computing objects or devices 2920, 2922, 2924, 2926, 2928, etc., which may include programs, methods, data stores, programmable logic, etc., as represented by applications 2930, 2932, 2934, 2936, 2938. It can be appreciated that objects 2910, 2912, etc. and computing objects or devices 2920, 2922, 2924, 2926, 2928, etc. may comprise different devices, such as PDAs, audio/video devices, mobile phones, MP3 players, personal computers, laptops, etc.

Each object 2910, 2912, etc. and computing objects or devices 2920, 2922, 2924, 2926, 2928, etc. can communicate with one or more other objects 2910, 2912, etc. and computing objects or devices 2920, 2922, 2924, 2926, 2928, etc. by way of the communications network 2940, either directly or indirectly. Even though illustrated as a single element in FIG. 29, network 2940 may comprise other computing objects and computing devices that provide services to the system of FIG. 29, and/or may represent multiple interconnected networks, which are not shown. Each object 2910, 2912, etc. or 2920, 2922, 2924, 2926, 2928, etc. can also contain an application, such as applications 2930, 2932, 2934, 2936, 2938, that might make use of an API, or other object, software, firmware and/or hardware, suitable for communication with or implementation of the image-based modeling functionality provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to image-based modeling as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 29, as a non-limiting example, computers 2920, 2922, 2924, 2926, 2928, etc. can be thought of as clients and computers 2910, 2912, etc. can be thought of as servers where servers 2910, 2912, etc. provide data services, such as receiving data from client computers 2920, 2922, 2924, 2926, 2928, etc., storing of data, processing of data, transmitting data to client computers 2920, 2922, 2924, 2926, 2928, etc., although any computer can be considered a client, a server, or both, depending on the circumstances. Any of these computing devices may be processing data, forming metadata, synchronizing data or requesting services or tasks that may implicate image-based modeling as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing image-based modeling can be provided standalone, or distributed across multiple computing devices or objects.

In a network environment in which the communications network/bus 2940 is the Internet, for example, the servers 2910, 2912, etc. can be Web servers with which the clients 2920, 2922, 2924, 2926, 2928, etc. communicate via any of a number of known protocols, such as the hypertext transfer protocol (HTTP). Servers 2910, 2912, etc. may also serve as clients 2920, 2922, 2924, 2926, 2928, etc., as may be characteristic of a distributed computing environment.

Exemplary Computing Device

As mentioned, advantageously, the techniques described herein can be applied to any device where it is desirable to perform image-based modeling. It should be understood, therefore, that handheld, portable and other computing devices and computing objects of all kinds are contemplated for use in connection with the various embodiments, e.g., anywhere that a device may wish to synchronize data. Accordingly, the below general purpose remote computer described below in FIG. 30 is but one example of a computing device. Additionally, image-based modeling can include one or more aspects of the below general purpose computer, such as display or output of the façades being modeled via the display 3050.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 30:
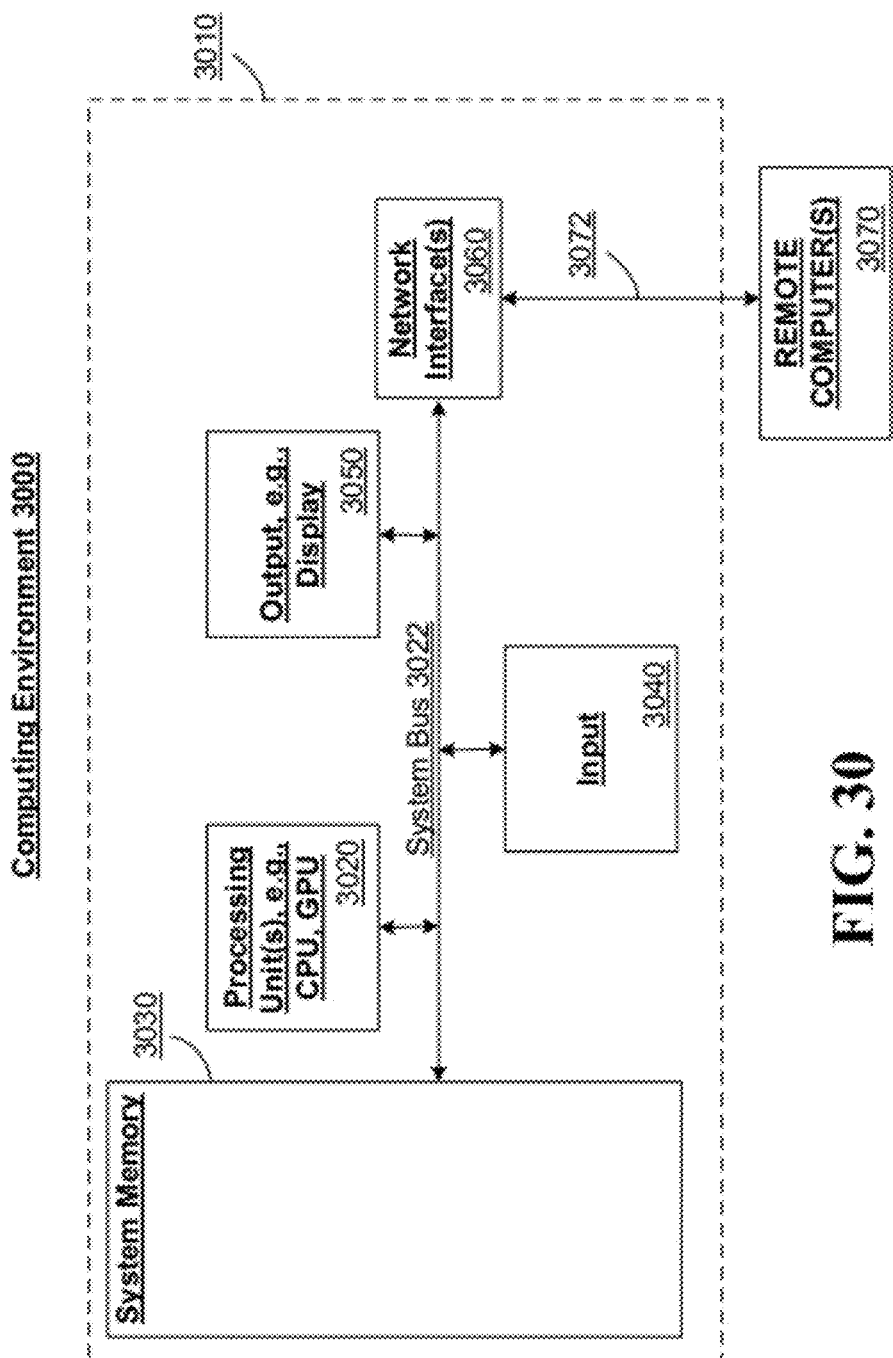
FIG. 30 is a block diagram representing an exemplary non-limiting computing system or operating environment in which one or more aspects of various embodiments described herein can be implemented.

FIG. 30 thus illustrates an example of a suitable computing system environment 3000 in which one or aspects of the embodiments described herein can be implemented, although as made clear above, the computing system environment 3000 is only one example of a suitable computing environment and is not intended to suggest any limitation as to scope of use or functionality. Neither should the computing environment 3000 be interpreted as having any dependency or requirement relating to any one or combination of components illustrated in the exemplary operating environment 3000.

With reference to FIG. 30, an exemplary remote device for implementing one or more embodiments includes a general purpose computing device in the form of a computer 3010. Components of computer 3010 may include, but are not limited to, a processing unit 3020, a system memory 3030, and a system bus 3022 that couples various system components including the system memory to the processing unit 3020.

Computer 3010 typically includes a variety of computer readable media and can be any available media that can be accessed by computer 3010. The system memory 3030 may include computer storage media in the form of volatile and/or nonvolatile memory such as read only memory (ROM) and/or random access memory (RAM). By way of example, and not limitation, memory 3030 may also include an operating system, application programs, other program modules, and program data.

A user can enter commands and information into the computer 3010 through input devices 3040. A monitor or other type of display device is also connected to the system bus 3022 via an interface, such as output interface 3050. In addition to a monitor, computers can also include other peripheral output devices such as speakers and a printer, which may be connected through output interface 3050.

The computer 3010 may operate in a networked or distributed environment using logical connections (e.g., network interface(s) 3060) to one or more other remote computers, such as remote computer 3070. The remote computer 3070 may be a personal computer, a server, a router, a network PC, a peer device or other common network node, or any other remote media consumption or transmission device, and may include any or all of the elements described above relative to the computer 3010. The logical connections depicted in FIG. 30 include a network 3072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to perform image-based modeling.

Also, there are multiple ways to implement the same or similar functionality, e.g., an appropriate API, tool kit, driver code, operating system, control, standalone or downloadable software object, etc. which enables applications and services to use the image-based modeling functionality. Thus, embodiments herein are contemplated from the standpoint of an API (or other software object), as well as from a software or hardware object that implements one or more aspects of image-based modeling as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method, comprising:
receiving, by a computing device comprising a processor, input image data, wherein the input image data represents a façade;
reconstructing, by the computing device, the input image data comprising determining three-dimensional (3D) points, lines, and camera positions associated with the façade;
performing, by the computing device, a multi-view semantic segmentation on the reconstructed input image data comprising:
recognizing a façade structure; and
segmenting the façade as a result of the recognizing;
block partitioning, by the computing device, the reconstructed input image data into a plurality of independent object blocks comprising a first object block and at least a second object block, comprising ignoring vertical line segments comprising extensions that cross a defined number of horizontal line segments; and
separating, by the computing device, the first object block from at least the second object block comprising using one or more line structures in the input image data, wherein the first object block and at least the second object block belong to a same object class.

2. The method of claim 1, further comprising:
receiving, by the computing device, a segmentation instruction; and
refining, by the computing device, the multi-view semantic segmentation in response to the segmentation instruction being received.

3. The method of claim 1, further comprising:
performing, by the computing device, an inverse orthographic composition on the reconstructed input image data associated with the first object block and at least the second object block; and
producing, by the computing device, a composed orthographic depth map and texture for the first object block and at least the second object block based on the inverse orthographic composition.

4. The method of claim 3, further comprising:
receiving, by the computing device, an inpainting instruction; and
editing, by the computing device, at least one of the composed orthographic depth map or texture based on the inpainting instruction.

5. The method of claim 3, further comprising:
performing, by the computing device, structural analysis and regularization of the composed orthographic depth map and texture; and
identifying, by the computing device, one or more structural elements at different façade depths for the first object block and at least the second object block.

6. The method of claim 5, further comprising:
generating, by the computing device, a 3D model comprising generating geometry for the first object block and at least the second object block from the identified one or more structural elements at the different façade depths and texturing the first object block and at least the second object block.

7. The method of claim 6, further comprising:
generating, by the computing device, a city model comprising combining the generated 3D model for the first object block and at least the second object block with a 3D model for at least a third object block.

8. A system comprising:
a processor that executes or facilitates execution of computer executable components stored in a memory, the computer executable components comprising:
a multi-view semantic segmentation component configured to create a semantic segmentation of a façade based at least in part on a registered sequence of images associated with the façade;
a partitioning component configured to block partition the semantic segmentation into a plurality of object blocks comprising:
determining a number of times that a first vertical line crosses horizontal lines within the façade, and
determining the number of times satisfies a threshold amount, wherein the partitioning component ignores the first vertical line for the block partition; and
a block separator component configured to distinguish a first object block of the plurality of object blocks from a second object block of the plurality of object blocks, wherein the first object block and the second object block are classified in a same object class.

9. The system of claim 8, further comprising:
an image reconstruction component configured to register a sequence of images representing the façade and produce the registered sequence of images, wherein the image reconstruction component is also configured to compute reconstructed image data comprising three-dimensional (3D) points, lines, and camera positions associated with the façade.

10. The system of claim 8, further comprising:
an inverse orthographic composition component configured to compose an orthographic depth map and texture from reconstructed image data for the first object block.

11. The system of claim 10, further comprising:
a structural analysis and regularization component configured to determine structural elements at two or more different façade depths from the orthographic depth map and the texture for the first object block.

12. The system of claim 11, further comprising:
a modeling component configured to generate block geometry for the first object block from the determined structural elements at the two or more different façade depths.

13. The system of claim 12, the modeling component is further configured to texture the first object block and create an object block model associated with the façade.

14. The system of claim 12, the modeling component is further configured to merge an object block model associated with the façade with at least one other object block model associated with the façade and compose a composite façade model.

15. The system of claim 9, further comprising:
an interface component configured to receive the sequence of images representing the façade.

16. The system of claim 15, the interface component is further configured to receive instructions that, in response to execution by the system, at least one of refine the semantic segmentation of the façade, or edit at least one of a depth map or a texture associated with the façade.

17. A method, comprising:
performing, by a system comprising a processor, a multi-view semantic segmentation on at least a subset of reconstructed input image data representing a façade, wherein the performing comprises recognizing façade structure and segmenting the façade based on the recognizing resulting in a segmented façade;
block partitioning, by the system, at least the subset of reconstructed input image data comprising:
determining respective scores for a set of vertical lines in the reconstructed input image data, wherein the respective scores represent a number of times each vertical line of the set of vertical lines crosses horizontal lines in the reconstructed input image data,
selecting a subset of vertical lines from the set of vertical lines based in part on the respective scores, the selecting comprising ignoring vertical line segments comprises extensions that cross a defined number of horizontal line segments, and
producing at least one object block associated with the segmented façade based in part on the subset of vertical lines;
performing, by the system, an inverse orthographic composition on at least the subset of reconstructed input image data associated with the at least one object block comprising producing a composed orthographic depth map and a composed orthographic texture for the at least one object block; and
performing, by the system, structural analysis and regularization of the composed orthographic depth map and the composed orthographic texture comprising identifying structural elements at a plurality of façade depths for the at least one object block.

18. The method of claim 17, further comprising:
generating, by the system, an object model comprising generating geometry for the at least one object block from the identified structural elements at the plurality of façade depths and texturing the at least one object block.

19. The method of claim 17, wherein the block partitioning further comprising:
producing at least another object block associated with the segmented façade, wherein the at least one object block and the at least another object block are adjacent in the segmented façade and belong to a same object class; and
separating the at least one object block from the at least another object block.

20. The method of claim 19, wherein the separating comprises using line structures in the segmented façade to partition the at least one object block from the at least another object block.

* * * * *